United States Patent
Shukunami

(12) United States Patent (10) Patent No.: US 11,171,768 B2
Shukunami (45) Date of Patent: Nov. 9, 2021

(54) TRANSMISSION DEVICE, RECEPTION DEVICE, TRANSMISSION METHOD, AND RECEPTION METHOD

(71) Applicant: FUJITSU LIMITED, Kawasaki (JP)

(72) Inventor: Norifumi Shukunami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/877,565

(22) Filed: May 19, 2020

(65) Prior Publication Data
US 2020/0382270 A1 Dec. 3, 2020

(30) Foreign Application Priority Data

May 28, 2019 (JP) .............................. JP2019-099348

(51) Int. Cl.
H04L 7/00 (2006.01)
H04L 12/707 (2013.01)
H04L 12/26 (2006.01)
H04L 12/721 (2013.01)

(52) U.S. Cl.
CPC ............ *H04L 7/0075* (2013.01); *H04L 43/12* (2013.01); *H04L 43/50* (2013.01); *H04L 45/24* (2013.01); *H04L 45/70* (2013.01)

(58) Field of Classification Search
None
See application file for complete search history.

(56) References Cited

U.S. PATENT DOCUMENTS

| 6,690,884 | B1 * | 2/2004 | Kelty | ................... | H04B 10/695 398/27 |
| 7,035,537 | B2 * | 4/2006 | Wang | ................... | H04J 14/0227 398/49 |
| 2003/0035171 | A1 * | 2/2003 | Touma | | |
| 2003/0147138 | A1 * | 8/2003 | Price | | |
| 2003/0165006 | A1 * | 9/2003 | Stephens | | |
| 2003/0215231 | A1 * | 11/2003 | Weston-Dawkes | | |
| 2005/0078959 | A1 * | 4/2005 | Shin | | |
| 2006/0018665 | A1 * | 1/2006 | Shibata | ................... | H04L 45/62 398/173 |
| 2006/0269287 | A1 * | 11/2006 | Bidmead | ............ | H04B 10/2916 398/130 |
| 2009/0169212 | A1 | 7/2009 | Onaka et al. | | |
| 2011/0008049 | A1 * | 1/2011 | Tanonaka | ............ | H04J 14/0275 398/79 |
| 2015/0043907 | A1 * | 2/2015 | Cavaliere | ............ | H04J 14/0246 398/30 |
| 2020/0099444 | A1 * | 3/2020 | Li | ...................... | H04B 10/0775 |

FOREIGN PATENT DOCUMENTS

| JP | H09-102991 A | 4/1997 |
| JP | 2001-024589 A | 1/2001 |
| JP | 2009-159290 A | 7/2009 |

* cited by examiner

*Primary Examiner* — Darren E Wolf

(74) *Attorney, Agent, or Firm* — Fujitsu Patent Center

(57) ABSTRACT

A transmission device includes a transmitter configured to output first monitoring signal light regarding monitoring control of the transmission device; and a switch that switches an output destination of the first monitoring signal light output from the transmitter to any one of a first transmission path or a second transmission path, wherein in the first transmission path, a first main signal is transmitted from the transmission device to another transmission device, and in the second transmission path, a second main signal is transmitted from the other transmission device to the transmission device.

11 Claims, 16 Drawing Sheets

TRANSMISSION DEVICE, RECEPTION DEVICE, TRANSMISSION METHOD, AND RECEPTION METHOD

CROSS-REFERENCE TO RELATED APPLICATION

This application is based upon and claims the benefit of priority of the prior Japanese Patent Application No. 2019-99348, filed on May 28, 2019, the entire contents of which are incorporated herein by reference.

FIELD

The embodiments discussed herein are related to a transmission device and a transmission method.

BACKGROUND

For example, there is a transmission device that multiplexes monitoring signal light of a transmission system with main signal light in which a plurality of wavelength light beams is multiplexed and transmits the light. For example, Japanese Laid-open Patent Publication No. 2009-159290 and the like are disclosed as related art.

SUMMARY

According to an aspect of the embodiments, a transmission device includes a transmitter configured to output first monitoring signal light regarding monitoring control of the transmission device; and a switch that switches an output destination of the first monitoring signal light output from the transmitter to any one of a first transmission path or a second transmission path, wherein in the first transmission path, a first main signal is transmitted from the transmission device to another transmission device, and in the second transmission path, a second main signal is transmitted from the other transmission device to the transmission device.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When transmission power of the monitoring signal light increases, a nonlinear optical effect such as cross-phase modulation occurs in main signal light and monitoring signal light in a transmission path. Therefore, there is a possibility that transmission quality of the main signal light is deteriorated. Whereas, when a transmission direction of the monitoring signal light and a transmission direction of the main signal light in the transmission path are set to be opposite to each other, an interaction length of the cross-phase modulation is shortened than that in a case where the transmission directions are the same. Therefore, the nonlinear optical effect can be suppressed.

However, a transmission device in which transmission directions of monitoring signal light and main signal light are opposite to each other (hereinafter, referred to as "backward transmission device") and a transmission device in which transmission directions of monitoring signal light and main signal light are the same (hereinafter, referred to as "forward transmission device") are mixed in a network, it is not possible for the backward transmission device and the forward transmission device to transmit and receive the monitoring signal light to each other. Therefore, a combination of the transmission devices that can be connected to each other in the network is limited to a combination of the backward transmission devices or a combination of the forward transmission devices.

Therefore, an object of this case is to provide a transmission device and a transmission method that can switch a transmission direction of monitoring signal light with respect to main signal light.

As one aspect, it is possible to switch the transmission direction of the monitoring signal light with respect to the main signal light.

Figure 1:
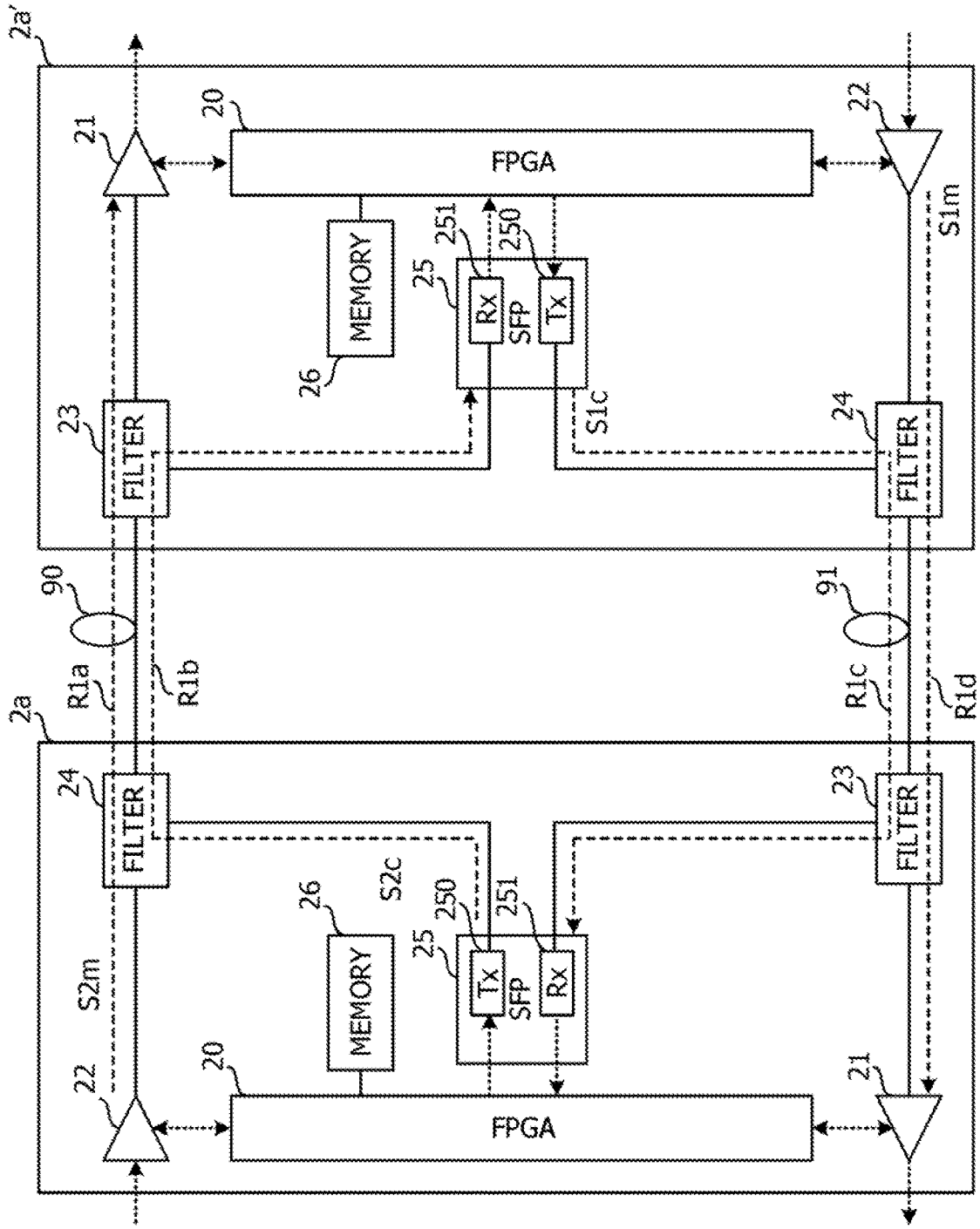
FIG. 1 is a configuration diagram illustrating an example of a transmission system in which forward transmission devices are connected to each other.

FIG. 1 is a configuration diagram illustrating an example of a transmission system in which forward transmission devices $2a$ and $2a'$ are connected to each other. The transmission system includes a pair of the forward transmission devices $2a$ and $2a'$ connected to each other via transmission paths 90 and 91 such as optical fibers. Note that the forward transmission devices $2a$ and $2a'$ have the same configuration.

The forward transmission devices $2a$ and $2a'$ are wavelength multiplexing transmission devices, for example, a Reconfigurable Optical Add-and-Drop Multiplexer (ROADM) or the like. The forward transmission devices $2a$ and $2a'$ respectively transmit main signal light $S2m$ and main signal light $S1m$ obtained by multiplexing a plurality of wavelength light beams having different wavelengths. In the main signal light Sm, a plurality of wavelength light beams including user data such as the Ethernet (registered trademark, the same applies below) frames is multiplexed.

The forward transmission device $2a$ transmits the main signal light $S2m$ and monitoring signal light $S2c$ regarding monitoring control of the forward transmission device $2a$ to the other forward transmission device $2a'$ via the transmission path 90, and the other forward transmission device $2a'$ receives the main signal light $S2m$ and the monitoring signal light $S2c$. At this time, the forward transmission device $2a$ multiplexes the monitoring signal light $S2c$ with the main signal light $S2m$ and outputs the obtained light to the transmission path 90.

In this way, the main signal light $S2m$ and the monitoring signal light $S2c$ are transmitted in the same direction through the transmission path 90. A reference numeral Ria indicates a path of the main signal light $S2m$ transmitted from the forward transmission device $2a$ to the forward transmission device $2a'$, and a reference numeral Rib indicates a path of the monitoring signal light $S2c$ transmitted from the forward transmission device $2a$ to the forward transmission device $2a'$.

The forward transmission device $2a'$ transmits the main signal light $S1m$ and the monitoring signal light $S1c$ regarding monitoring control of the forward transmission device $2a'$ to the other forward transmission device $2a$ via the transmission path 91, and the other forward transmission device $2a$ receives the main signal light $S1m$ and the monitoring signal light $S1c$. At this time, the forward transmission device $2a'$ multiplexes the monitoring signal light $S1c$ with the main signal light $S1m$ and outputs the obtained light to the transmission path 91.

In this way, the main signal light $S1m$ and the monitoring signal light $S1c$ are transmitted in the same direction through the transmission path 91. A reference numeral Rid indicates a path of the main signal light $S1m$ transmitted from the forward transmission device $2a'$ to the forward transmission device $2a$, and a reference numeral $R1c$ indicates a path of the monitoring signal light $S1c$ transmitted from the forward transmission device $2a'$ to the forward transmission device $2a$.

The monitoring signal light $S1c$ and the monitoring signal light $S2c$ are, for example, Optical Supervisory Channel (OSC) light and include monitoring control information such as an optical fiber connection state. The monitoring signal light $S1c$ and the monitoring signal light $S2c$ have wavelengths respectively separated from wavelength bands of wavelength light included in the main signal light $S1m$ and $S2m$ by a predetermined wavelength band. The forward transmission devices $2a$ and $2a'$ perform various control regarding the transmission of the main signal light $S1m$ and $S2m$ on the basis of the monitoring control information. Configurations of the forward transmission devices $2a$ and $2a'$ will be described below.

Each of the forward transmission devices $2a$ and $2a'$ includes an FPGA 20, a memory 26, an SFP 25, optical amplifiers 21 and 22, and filters 23 and 24. Note that the forward transmission devices $2a$ and $2a'$ may include another circuit such as an Application Specified Integrated Circuit (ASIC) instead of the FPGA 20.

The optical amplifier 22 amplifies the main signal light $S1m$ and $S2m$ input from adjacent nodes. The FPGA 20 controls a gain of the optical amplifier 22. The main signal light $S1m$ and $S2m$ is input from the optical amplifier 22 to the filter 24.

The SFP 25 is an optical module that is detachable from the forward transmission devices $2a$ and $2a'$. The SFP 25 includes a transmission unit (Tx) 250 that transmits the monitoring signal light $S1c$ and $S2c$ and a reception unit (Rx) 251 that receives the monitoring signal light $S1c$ and $S2c$.

The transmission unit 250 generates the monitoring signal light $S1c$ and $S2c$ by intensity modulation based on the monitoring control information. The transmission unit 250 includes a laser diode that outputs the monitoring signal light $S1c$ and $S2c$, a modulation circuit, or the like. The monitoring signal light $S1c$ and $S2c$ is input from the transmission unit 250 to the filter 24.

The filter 24 of the forward transmission device $2a'$ multiplexes the monitoring signal light $S1c$ with the main signal light $S1m$, and the filter 24 of the forward transmission device $2a$ multiplexes the monitoring signal light $S2c$ with the main signal light $S2m$. As the filter 24, for example, an optical filter that has a wavelength multiplexing function is exemplified. However, the filter 24 is not limited to this. The multiplexed light of the monitoring signal light $S1c$ and the main signal light $S1m$ is output from the filter 24 to the transmission path 91, and the multiplexed light of the monitoring signal light $S2c$ and the main signal light $S2m$ is output from the filter 24 to the transmission path 90.

The multiplexed light of the monitoring signal light $S1c$ and the main signal light $S1m$ is input from the transmission path 91 to the filter 23 of the forward transmission device $2a$. The filter 23 separates the main signal light $S1m$ and the monitoring signal light $S1c$ from the multiplexed light input from the transmission path 91.

Furthermore, the multiplexed light of the monitoring signal light $S2c$ and the main signal light $S2m$ is input from the transmission path 90 to the filter 23 of the forward transmission device $2a'$. The filter 23 separates the main signal light $S2m$ and the monitoring signal light $S2c$ from the multiplexed light input from the transmission path 91. As the filter 24, for example, an optical filter that has a wavelength separating function is exemplified. However, the filter 24 is not limited to this.

Each of the main signal light $S1m$ and $S2m$ is input from the filter 24 to the optical amplifier 21. The optical amplifier 21 amplifies the main signal light $S1m$ and $S2m$. The FPGA 20 controls a gain of the optical amplifier 21. The main signal light S1m and the main signal light S2m are respectively output from the optical amplifier 21 to the adjacent nodes.

The reception unit 251 of the SFP 25 receives the monitoring signal light S1c and S2c, converts the monitoring signal light S1c and S2c into electrical monitoring signals, and outputs the signals to the FPGA 20. The reception unit 251 includes a Photo Diode (PD) that converts the monitoring signal light S1c and S2c into monitoring signals.

The FPGA 20 acquires the monitoring control information from payload data of the monitoring signal. The FPGA 20, for example, controls the gains of the optical amplifiers 21 and 22 on the basis of the monitoring control information. At this time, the FPGA 20 uses various databases stored in the memory 26, for example.

When transmission power of the monitoring signal light S1c and S2c increases, a nonlinear optical effect such as cross-phase modulation occurs in the main signal light S1m and S2m and the monitoring signal light S1c and S2c in the transmission paths 91 and 90. Therefore, there is a possibility that transmission quality of the main signal light S1m and S2m is deteriorated. Whereas, when the transmission direction of the monitoring signal light S1c and S2c and the transmission direction of the main signal light S1m and S2m in the transmission paths 91 and 90 are respectively set to be opposite to each other, an interaction length of the cross-phase modulation is shortened than that in a case where the transmission directions are the same as in the present embodiment. Therefore, the nonlinear optical effect can be suppressed.

Figure 2:
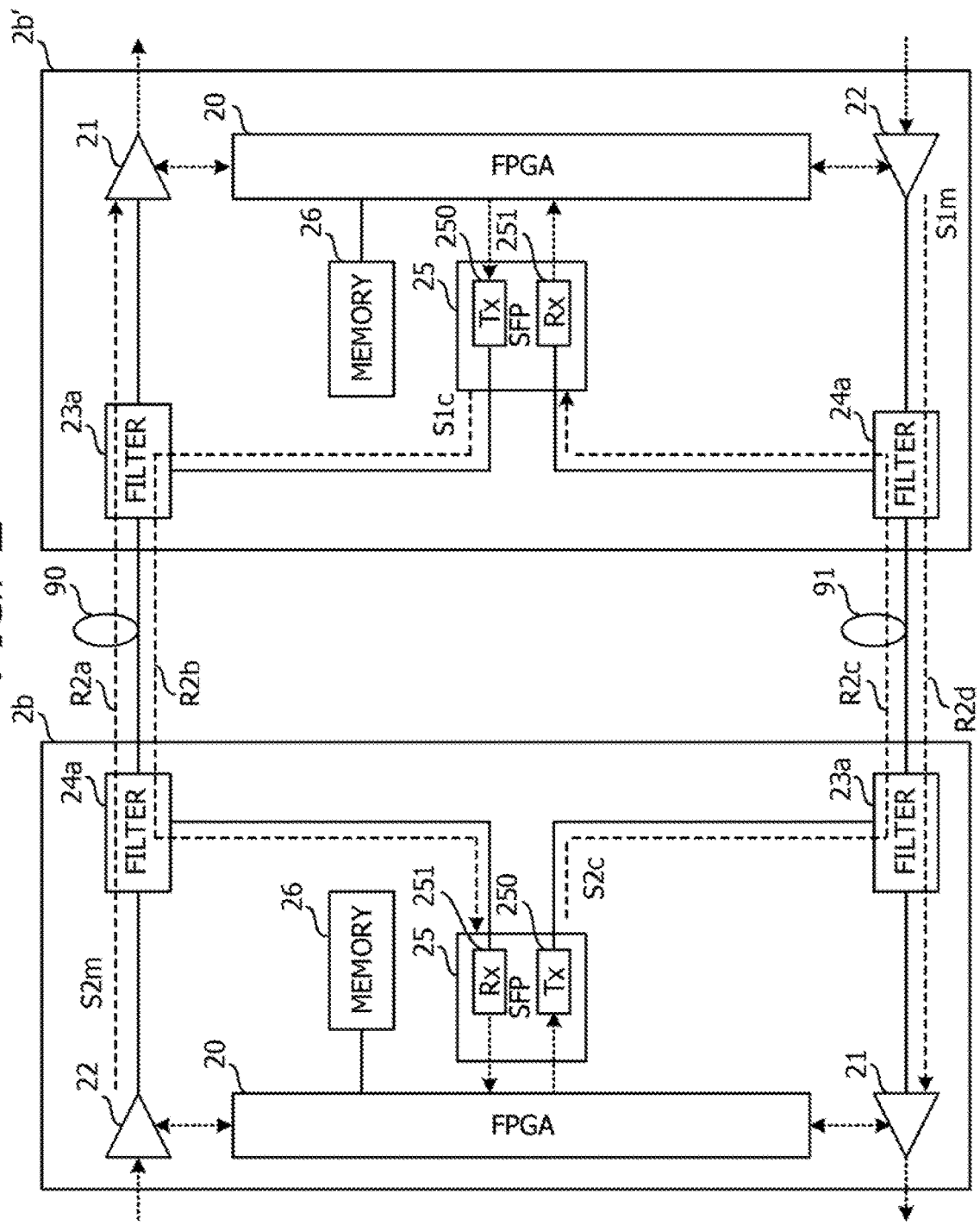
FIG. 2 is a configuration diagram illustrating an example of a transmission system in which backward transmission devices are connected to each other.

FIG. 2 is a configuration diagram illustrating an example of a transmission system in which backward transmission devices 2b and 2b' are connected to each other. In FIG. 2, the same components as those in FIG. 1 are denoted by the same reference numerals, and description thereof will be omitted.

The transmission system includes a pair of the backward transmission devices 2b and 2b' connected to each other via the transmission paths 90 and 91 such as optical fibers. Note that the backward transmission devices 2b and 2b' have the same configuration.

The backward transmission devices 2b and 2b' are, for example, wavelength multiplexing transmission devices such as a ROADM. The backward transmission devices 2b and 2b' respectively transmit main signal light S2m and main signal light S1m obtained by multiplexing a plurality of pieces of wavelength light having different wavelengths.

The backward transmission device 2b transmits the main signal light S2m to the other backward transmission device 2b' via the transmission path 90 and transmits the monitoring signal light S2c to the other backward transmission device 2b' via the transmission path 91. The backward transmission device 2b' receives the main signal light S2m and the monitoring signal light S2c.

Furthermore, the backward transmission device 2b' transmits the main signal light S1m to the other backward transmission device 2b via the transmission path 91 and transmits the monitoring signal light S1c to the other backward transmission device 2b via the transmission path 90. The other backward transmission device 2b receives the main signal light S1m and the monitoring signal light S1c.

As described above, the main signal light S2m and the monitoring signal light S1c are transmitted through the transmission path 90 in opposite directions, and the main signal light S1m and the monitoring signal light S2c are transmitted through the transmission path 91 in opposite directions. A reference numeral R2a indicates a path of the main signal light S2m transmitted from the backward transmission device 2b to the backward transmission device 2b', and a reference numeral R2b indicates a path of the monitoring signal light S1c transmitted from the backward transmission device 2b' to the backward transmission device 2b. Furthermore, a reference numeral R2c indicates a path of the monitoring signal light S2c transmitted from the backward transmission device 2b to the backward transmission device 2b', and a reference numeral R2d indicates a path of the main signal light S1m transmitted from the backward transmission device 2b' to the backward transmission device 2b.

Each of the backward transmission devices 2b and 2b' includes filters 23a and 24a instead of the filters 23 and 24. The filter 23a of the backward transmission device 2b guides the monitoring signal light S2c input from the transmission unit 250 to the transmission path 91, and the filter 24a of the backward transmission device 2b' guides the monitoring signal light S2c input from the transmission path 91 to the reception unit 251.

Furthermore, the filter 23a of the backward transmission device 2b' guides the monitoring signal light S1c input from the transmission unit 250 to the transmission path 90, and the filter 24a of the backward transmission device 2b guides the monitoring signal light S1c input from the transmission path 90 to the reception unit 251. As the filters 23a and 24a, for example, an optical filter that has a wavelength separating function is exemplified. However, the filters 23a and 24a are not limited to this.

In this way, in the transmission system in which the backward transmission devices 2b and 2b' are connected to each other, the main signal light S2m and the monitoring signal light S1c are transmitted through the transmission path 90 in opposite directions, and the main signal light S1m and the monitoring signal light S2c are transmitted through the transmission path 91 in opposite directions. Therefore, since an interaction length of cross-phase modulation is shortened than that in a case of the transmission system in which the forward transmission devices 2a and 2a' are connected to each other, a nonlinear optical effect can be suppressed.

However, in a case where the forward transmission devices 2a and 2a' and the backward transmission devices 2b and 2b' are mixed in a network, it is not possible for the forward transmission devices 2a and 2a' and the backward transmission devices 2b and 2b' to transmit and receive the monitoring signal light S1c and S2c. Therefore, a combination of the transmission devices that can be connected to each other in the network is limited to a combination of the backward transmission devices 2b and 2b' or a combination of the forward transmission devices 2a and 2a'.

Therefore, in the transmission device according to the embodiment, the transmission paths 90 and 91 in which the monitoring signal light S1c and S2c is transmitted are switched by switching the optical switch between the SFP and the transmission paths 90 and 91 or selecting the SFP. With this, it possible to switch transmission directions of the monitoring signal light S1c and the monitoring signal light S2c with respect to the main signal light S1m and the main signal light S2m transmitted in the respective transmission paths 90 and 91.

Therefore, in the transmission device according to the embodiment, even in a case where the transmission device is connected to any one of the forward transmission devices 2a and 2a' and the backward transmission devices 2b and 2b', the transmission device can transmit and receive the monitoring signal light S1c and S2c to each of the forward transmission devices 2a and 2a' and the backward transmission devices 2b and 2b'. Note that, in the following description, the transmission device according to the embodiment is referred to as a "bidirectional transmission device".

First Embodiment

Figure 3:
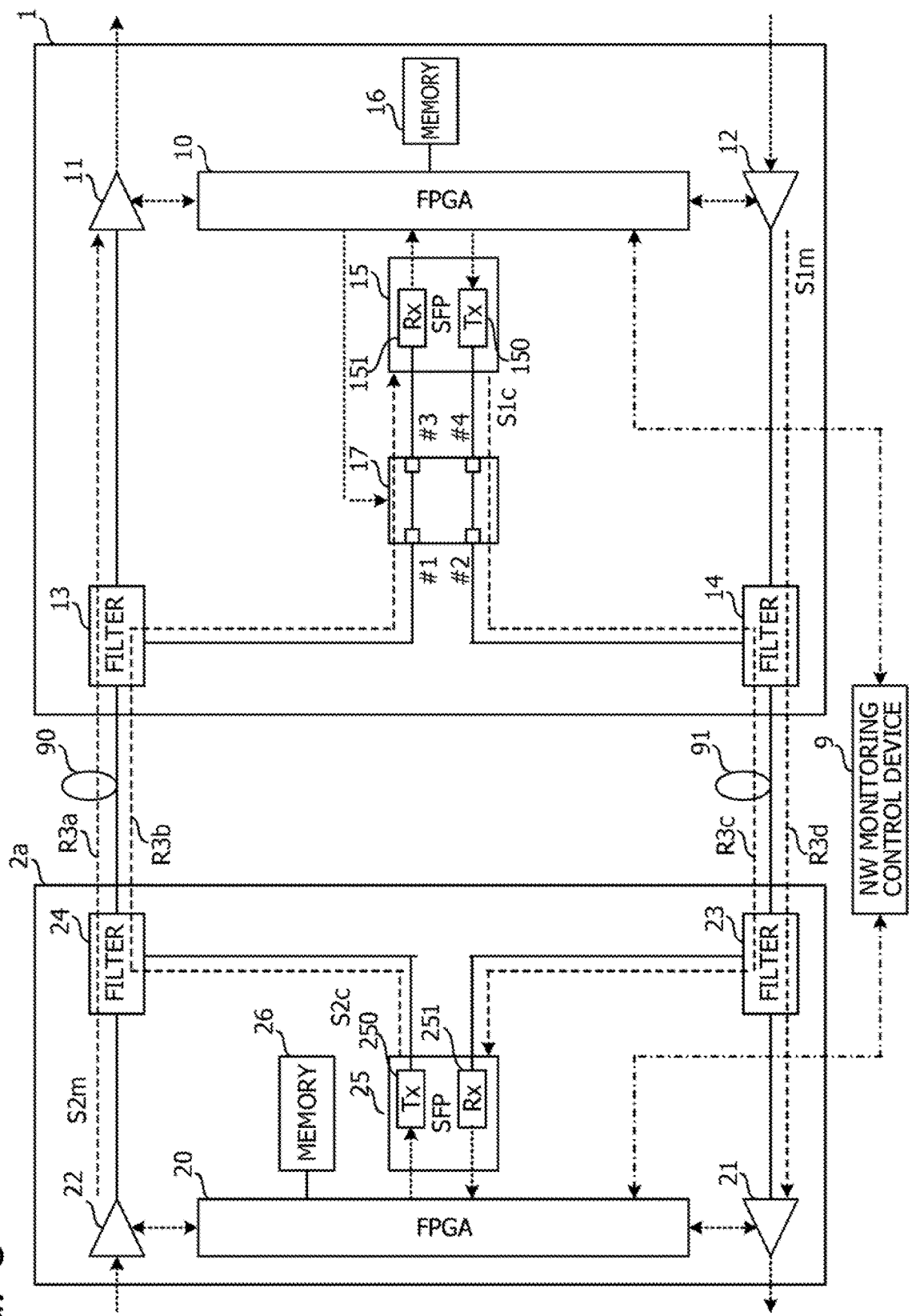
FIG. 3 is a configuration diagram illustrating an example of a transmission system, in which a bidirectional transmission device and a forward transmission device are connected to each other, according to a first embodiment.

FIG. 3 is a configuration diagram illustrating an example of a transmission system, in which a bidirectional transmission device 1 and a forward transmission device 2a are connected to each other, according to a first embodiment. In FIG. 3, the same components as those in FIG. 1 are denoted by the same reference numerals, and description thereof will be omitted. Note that the bidirectional transmission device 1 is an example of a first transmission device, and the forward transmission device 2a is an example of a second transmission device.

The transmission system includes the forward transmission device 2a and the bidirectional transmission device 1 connected via transmission paths 90 and 91. The configuration of the forward transmission device 2a is as described above.

The bidirectional transmission device 1 switches the transmission paths 90 and 91 of the monitoring signal light S1c and S2c by an optical switch 17 connected to an SFP 15. Therefore, the bidirectional transmission device 1 can transmit and receive the monitoring signal light S1c and S2c to and from any one of the forward transmission devices 2a and 2a' and the backward transmission devices 2b and 2b'. Here, the monitoring signal light S1c includes monitoring control information regarding monitoring control of the bidirectional transmission device 1.

FIG. 3 illustrates an operation of the bidirectional transmission device 1 in a case of being connected to the forward transmission device 2a. The bidirectional transmission device 1 transmits main signal light S1m and the monitoring signal light S1c to the forward transmission device 2a via the transmission path 91. The forward transmission device 2a receives the main signal light S1m and the monitoring signal light S1c.

Furthermore, the forward transmission device 2a transmits the main signal light S2m and the monitoring signal light S2c to the bidirectional transmission device 1 via the transmission path 90. The bidirectional transmission device 1 receives the main signal light S2m and the monitoring signal light S2c. Note that, the main signal light S1m is an example of first main signal light, and the main signal light S2m is an example of second main signal light. The monitoring signal light S1c is an example of first monitoring signal light, and the monitoring signal light S2c is an example of second monitoring signal light. Furthermore, the transmission path 91 is an example of a first transmission path, and the transmission path 90 is an example of a second transmission path.

In this way, the main signal light S2m and the monitoring signal light S2c are transmitted through the transmission path 90 in the same direction, and the main signal light S1m and the monitoring signal light S1c are transmitted through the transmission path 91 in the same direction. A reference numeral R3a indicates a path of the main signal light S2m transmitted from the forward transmission device 2a to the bidirectional transmission device 1, and a reference numeral R3b indicates a path of the monitoring signal light S2c transmitted from the forward transmission device 2a to the bidirectional transmission device 1.

Furthermore, a reference numeral R3d indicates a path of the main signal light S1m transmitted from the bidirectional transmission device 1 to the forward transmission device 2a, and a reference numeral R1c indicates a path of the monitoring signal light S1c transmitted from the bidirectional transmission device 1 to the forward transmission device 2a. A configuration of the bidirectional transmission device 1 will be described below.

The bidirectional transmission device 1 includes an FPGA 10, a memory 16, the SFP 15, optical amplifiers 11 and 12, filters 13 and 14, and the optical switch 17.

The optical amplifier 12 amplifies the main signal light S1m input from an adjacent node. The FPGA 10 controls a gain of the optical amplifier 12. The main signal light S1m is input from the optical amplifier 12 to the filter 14.

The SFP 15 is an optical module that is detachable from the bidirectional transmission device 1. The SFP 15 includes a transmission unit (Tx) 150 that transmits the monitoring signal light S1c to the forward transmission device 2a and a reception unit (Rx) 151 that receives the monitoring signal light S2c from the forward transmission device 2a.

The transmission unit 150 generates the monitoring signal light S1c by intensity modulation based on the monitoring control information input from the FPGA 10. The transmission unit 150 includes a laser diode that outputs the monitoring signal light S1c, a modulation circuit, or the like. The monitoring signal light S1c is input from the transmission unit 150 to the optical switch 17.

The optical switch 17 includes, for example, 2×2 ports #1 to #4 to/from which light is input/output. The port #1 is optically connected (for example, connection by optical fiber and the like. Similar meaning is indicated in the following description) to the filter 13, and the port #2 is optically connected to the filter 14. Furthermore, the port #3 is optically connected to the reception unit 151, and the port #4 is optically connected to the transmission unit 150.

The optical switch 17 switches connection states between the ports #1 and #2 and between the ports #3 and #4 to a straight state or a cross state according to a switching signal from the FPGA 10. The FPGA 10 outputs the switching signal to the optical switch 17 according to switch setting from a network (NW) monitoring control device 9 that monitors and controls a transmission system.

The network monitoring control device 9 acquires identification information of each device, for example, from the memory 26 of the forward transmission device 2a and the memory 16 of the bidirectional transmission device 1 via a monitoring network which is not illustrated. In a case of detecting the connection between the bidirectional transmission device 1 and the forward transmission device 2a on the basis of the identification information, the network monitoring control device 9 performs transmission setting of a "forward mode" to the FPGA 10 of the bidirectional transmission device 1. In a case of the transmission setting of the "forward mode", the FPGA 10 outputs a switching signal indicating the straight state to the optical switch 17.

Therefore, the optical switch 17 switches the connection state to the straight state. In a case of the straight state, the ports #1 and #3 are connected to each other, and the ports #2 and #4 are connected to each other.

With this connection, the transmission path 90 and the reception unit 151 are connected to each other via the filter 13, and the transmission path 91 and the transmission unit 150 are connected to each other via the filter 14. Note that the straight state is an example of a first connection state of the optical switch 17.

The monitoring signal light S1c transmitted by the transmission unit 150 is input to the filter 14 via the ports #4 and #2 of the optical switch 17.

The filter 14 guides the monitoring signal light S1c input from the optical switch 17 to the transmission path 91 and guides the main signal light S1m from the optical amplifier 12 to the transmission path 91. At this time, the filter 14 multiplexes the monitoring signal light S1c with the main signal light S1m. As the filter 14, for example, an optical filter that has a wavelength multiplexing and separating function is exemplified. However, the filter 14 is not limited to this. The multiplexed light of the monitoring signal light S1c and the main signal light S1m is output from the filter 14 to the transmission path 91.

The multiplexed light of the monitoring signal light S1c and the main signal light S1m is input from the transmission path 91 to the filter 23 of the forward transmission device 2a. The filter 23 separates the main signal light S1m and the monitoring signal light S1c from the multiplexed light input from the transmission path 91. With this operation, the forward transmission device 2a receives the main signal light S1m and the monitoring signal light S1c.

Furthermore, the forward transmission device 2a outputs the multiplexed light of the monitoring signal light S2c and the main signal light S2m to the transmission path 90. The multiplexed light is input from the transmission path 90 to the filter 13 of the bidirectional transmission device 1.

The filter 13 separates the main signal light S2m and the monitoring signal light S2c from the multiplexed light input from the transmission path 91. With this operation, the filter 13 guides the monitoring signal light S2c from the transmission path 90 to the optical switch 17 and guides the main signal light S2m from the transmission path 90 to the optical amplifier 11. As the filter 13, for example, an optical filter that has a wavelength multiplexing and separating function is exemplified. However, the filter 13 is not limited to this.

The main signal light S2m is input from the filter 13 to the optical amplifier 11. The optical amplifier 11 amplifies the main signal light S2m. The FPGA 10 controls a gain of the optical amplifier 11. The main signal light S2m is output from the optical amplifier 11 to the adjacent node.

Furthermore, the monitoring signal light S2c is input from the filter 13 to the reception unit 151 via the ports #1 and #3 of the optical switch 17. With this operation, the reception unit 151 receives the monitoring signal light S2c from the forward transmission device 2a.

The reception unit 151 receives the monitoring signal light S2c, converts the received monitoring signal light S2c into an electrical monitoring signal, and outputs the signal to the FPGA 10. The reception unit 151 includes a PD that converts the monitoring signal light S2c into a monitoring signal or the like.

The FPGA 10 acquires the monitoring control information from payload data of the monitoring signal. The FPGA 10, for example, controls the gains of the optical amplifiers 11 and 12 on the basis of the monitoring control information. At this time, the FPGA 10 uses various databases stored in the memory 16, for example.

In this way, when the connection state of the optical switch 17 is the straight state, the bidirectional transmission device 1 can transmit the monitoring signal light S1c via the transmission path 91 and receive the monitoring signal light S2c via the transmission path 90.

Therefore, the bidirectional transmission device 1 can transmit and receive the main signal light S1m and S2m and the monitoring signal light S1c and S2c to and from the forward transmission device 2a. At this time, the transmission directions of the main signal light S1m and the monitoring signal light S1c in the transmission path 91 are the same, and the transmission directions of the main signal light S2m and the monitoring signal light S2c in the transmission path 90 are the same.

Next, a transmission system in which a backward transmission device 2b and the bidirectional transmission device 1 are connected to each other will be described.

Figure 4:
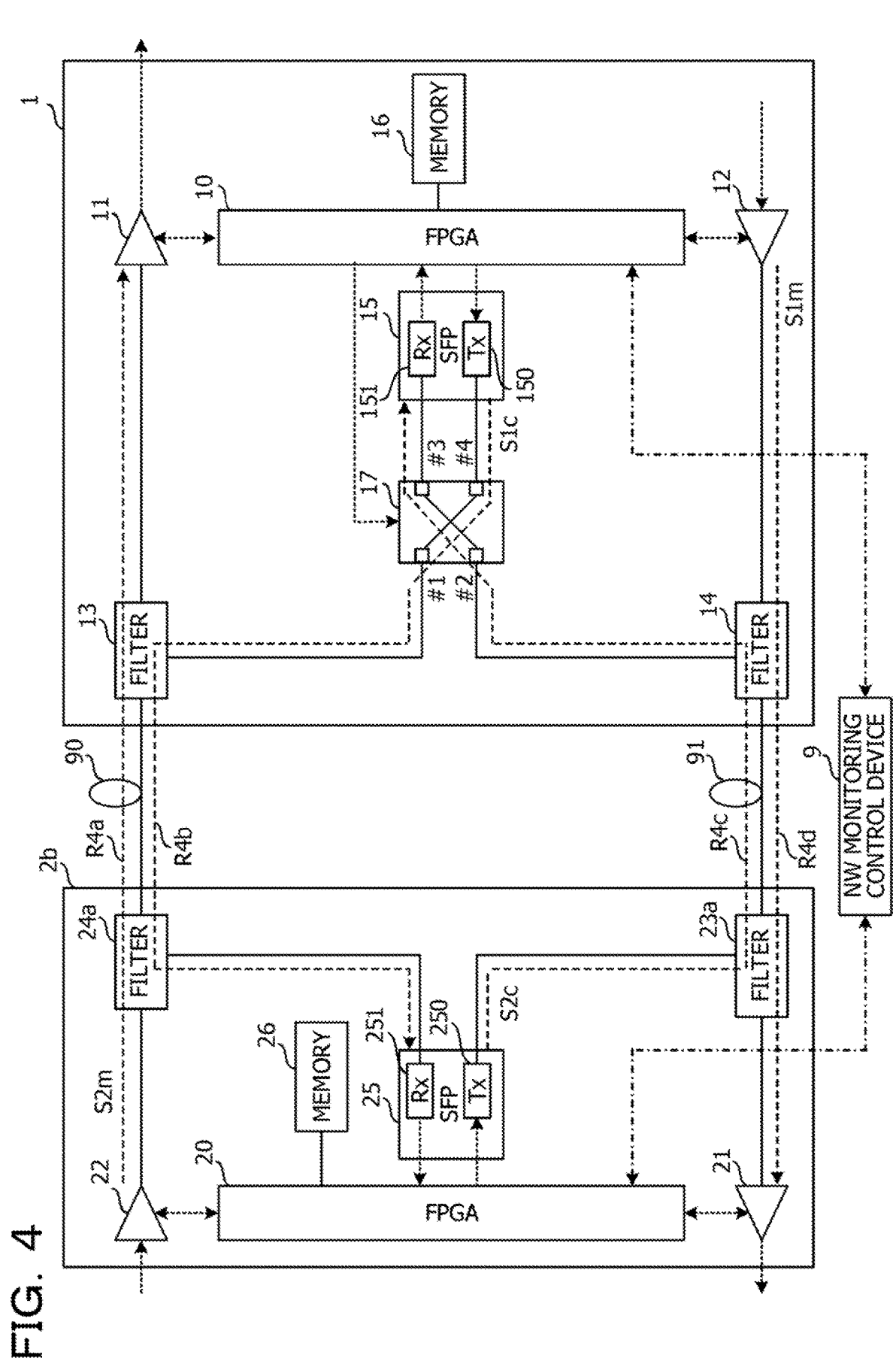
FIG. 4 is a configuration diagram illustrating an example of a transmission system, in which a bidirectional transmission device and a backward transmission device are connected to each other, according to the first embodiment.

FIG. 4 is a configuration diagram illustrating an example of a transmission system, in which the bidirectional transmission device 1 and the backward transmission device 2b are connected to each other, according to the first embodiment. In FIG. 4, the same components as those in FIGS. 2 and 3 are denoted by the same reference numerals, and description thereof will be omitted. Note that the backward transmission device 2b is an example of a second transmission device.

The transmission system includes the backward transmission device 2b and the bidirectional transmission device 1 connected to each other via the transmission paths 90 and 91. The configuration of the backward transmission device 2b is as described above.

FIG. 4 illustrates an operation of the bidirectional transmission device 1 in a case of being connected to the backward transmission device 2b. The bidirectional transmission device 1 transmits the main signal light S1m to the backward transmission device 2b via the transmission path 91 and transmits the monitoring signal light S1c to the backward transmission device 2b via the transmission path 90. The backward transmission device 2b receives the main signal light S1m and the monitoring signal light S1c.

Furthermore, the backward transmission device 2b transmits the main signal light S2m to the bidirectional transmission device 1 via the transmission path 90 and transmits the monitoring signal light S2c to the bidirectional transmission device 1 via the transmission path 91. The bidirectional transmission device 1 receives the main signal light S2m and the monitoring signal light S2c.

As described above, the main signal light S2m and the monitoring signal light S1c are transmitted through the transmission path 90 in opposite directions, and the main signal light S1m and the monitoring signal light S2c are transmitted through the transmission path 91 in opposite directions. A reference numeral R4a indicates a path of the main signal light S2m transmitted from the backward transmission device 2b to the bidirectional transmission device 1, and a reference numeral R4d indicates a path of the main signal light S1m transmitted from the bidirectional transmission device 1 to the backward transmission device 2b. A reference numeral R4c indicates a path of the monitoring signal light S2c transmitted from the backward transmission device 2b to the bidirectional transmission device 1, and a reference numeral R4b indicates a path of the monitoring signal light S1c transmitted from the bidirectional transmission device 1 to the backward transmission device 2b.

The network monitoring control device 9 acquires identification information of each device, for example, from the memory 26 of the backward transmission device 2b and the memory 16 of the bidirectional transmission device 1 via a monitoring network which is not illustrated. In a case of detecting the connection between the bidirectional transmission device 1 and the backward transmission device 2b on the basis of the identification information, the network monitoring control device 9 performs transmission setting of a "backward mode" to the FPGA 10 of the bidirectional transmission device 1. In a case of the transmission setting of the "backward mode", the FPGA 10 outputs a switching signal indicating the cross state to the optical switch 17.

Therefore, the optical switch 17 switches the connection state to the cross state. In a case of the cross state, the ports

1 and #4 are connected to each other, and the ports #2 and #3 are connected to each other.

With this connection, the transmission path 91 and the reception unit 151 are connected to each other via the filter 14, and the transmission path 90 and the transmission unit 150 are connected to each other via the filter 13. Note that the cross state is an example of a second connection state of the optical switch 17.

The monitoring signal light S1c transmitted by the transmission unit 150 is input to the filter 13 via the ports #4 and #1 of the optical switch 17. The filter 13 guides the monitoring signal light S1c input from the optical switch 17 to the transmission path 90 and guides the main signal light S2m from the transmission path 90 to the optical amplifier 11.

The monitoring signal light S1c is input from the transmission path 90 to the filter 24a of the backward transmission device 2b. The filter 24a guides the monitoring signal light S1c input from the transmission path 90 to the reception unit 251. With this operation, the backward transmission device 2b receives the monitoring signal light S1c.

Furthermore, in the backward transmission device 2b, the monitoring signal light S2c transmitted by the transmission unit 250 is output from the filter 23a to the transmission path 91. The monitoring signal light S2c is input from the transmission path 91 to the filter 14 of the bidirectional transmission device 1.

The filter 14 guides the monitoring signal light S2c from the transmission path 91 to the optical switch 17. The monitoring signal light S2c is input to the reception unit 151 via the ports #2 and #3 of the optical switch 17. With this operation, the reception unit 151 receives the monitoring signal light S2c from the backward transmission device 2b.

In this way, when the connection state of the optical switch 17 is the cross state, the bidirectional transmission device 1 can transmit the monitoring signal light S1c via the transmission path 90 and can receive the monitoring signal light S2c via the transmission path 91.

Therefore, the bidirectional transmission device 1 can transmit and receive the main signal light S1m and S2m and the monitoring signal light S1c and S2c to and from the backward transmission device 2b. At this time, the transmission directions of the main signal light S1m and the monitoring signal light S2c in the transmission path 91 are opposite to each other, and the transmission directions of the main signal light S2m and the monitoring signal light S1c in the transmission path 90 are opposite to each other.

Therefore, the bidirectional transmission device 1 can switch the transmission directions of the monitoring signal light S1c and S2c with respect to the main signal light S1m and S2m by switching the connection state of the optical switch 17.

Figure 5:
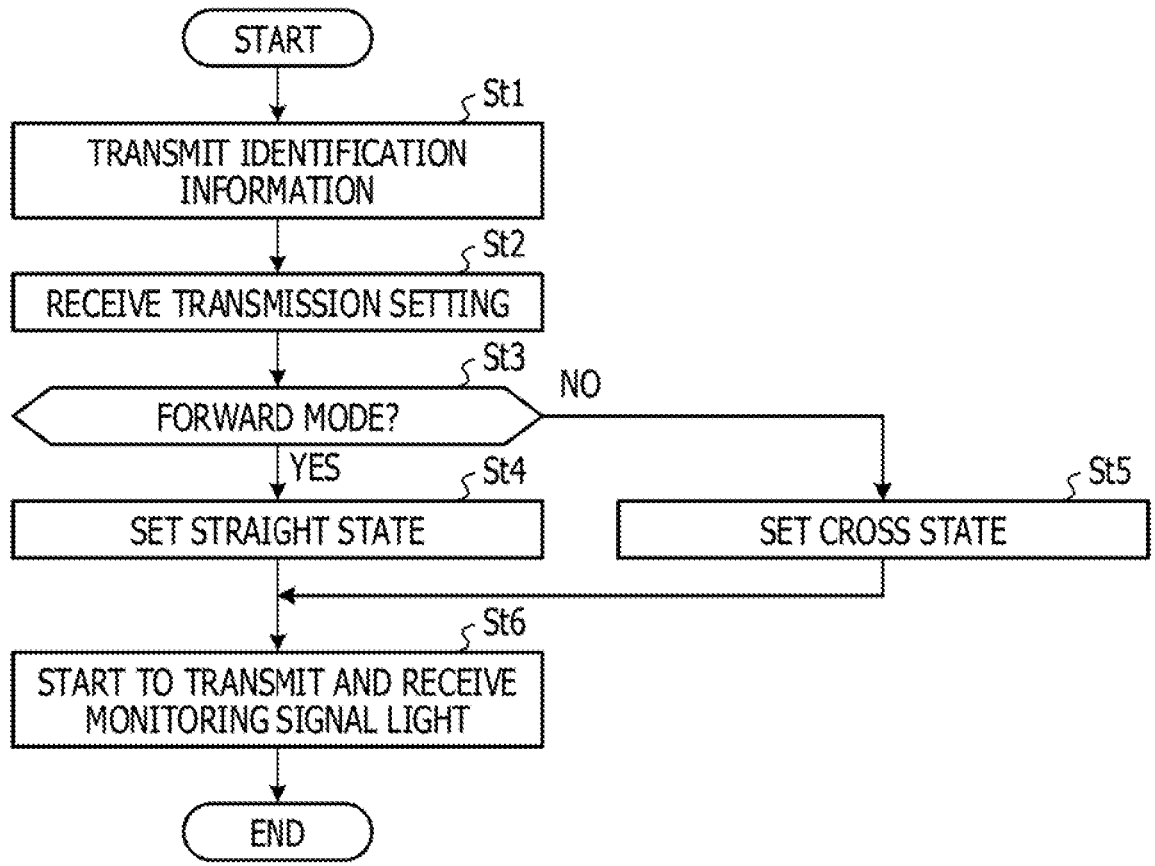
FIG. 5 is a flowchart illustrating an example of setting processing of an optical switch of the bidirectional transmission device according to the first embodiment.

FIG. 5 is a flowchart illustrating an example of setting processing of the optical switch 17 of the bidirectional transmission device 1 according to the first embodiment. This processing is a transmission method according to the embodiment.

The FPGA 10 reads the identification information of the device, for example, from the memory 16 in response to a request from the network monitoring control device 9 and transmits the identification information to the network monitoring control device 9 (step St1). At this time, the network monitoring control device 9 acquires identification information from the forward transmission device 2a or the backward transmission device 2b to which the bidirectional transmission device 1 is connected.

The network monitoring control device 9 determines, from the identification information, which one of the forward transmission device 2a or the backward transmission device 2b is a transmission device to which the bidirectional transmission device 1 is connected. In a case where the connection destination is the forward transmission device 2a, the network monitoring control device 9 transmits information regarding the transmission setting of the "forward mode" to the bidirectional transmission device 1, and in a case where the connection direction is the backward transmission device 2b, the network monitoring control device 9 transmits information regarding the transmission setting of the "backward mode" to the bidirectional transmission device 1.

Next, the FPGA 10 receives the information regarding the transmission setting from the network monitoring control device 9 via a communication port that is not illustrated (step St2). In a case where the transmission setting is the "forward mode" (Yes in step St3), the FPGA 10 sets the connection state of the optical switch 17 to the straight state by a switching signal (step St4). Furthermore, in a case where the transmission setting is the "backward mode" (No in step St3), the FPGA 10 sets the connection state of the optical switch 17 to the cross state by a switching signal (step St5).

Next, the FPGA 10 starts transmission and reception of the monitoring signal light S1c and S2c by the SFP 15 (step St6). In this way, the bidirectional transmission device 1 executes the setting processing of the optical switch 17.

In this way, the bidirectional transmission device 1 can transmit and receive the main signal light S1m and S2m and the monitoring signal light S1c and S2c to and from the backward transmission device 2b by switching the connection state of the optical switch 17 to the cross state.

Therefore, the bidirectional transmission device 1 can transmit and receive the main signal light S1m and S2m and the monitoring signal light S1c and S2c to and from both of the forward transmission device 2a and the backward transmission device 2b. For example, the bidirectional transmission device 1 has connection compatibility with the forward transmission device 2a and the backward transmission device 2b.

Therefore, the bidirectional transmission device 1 can relax limitation in combinations of the transmission devices that can be connected to each other in the network.

Furthermore, the FPGA 10 acquires setting information according to the combination of the bidirectional transmission device 1 and the forward transmission device 2a or the backward transmission device 2b and instructs the optical switch 17 to switch the connection state on the basis of the setting information. Therefore, the bidirectional transmission device 1 can easily switch the connection state of the optical switch 17 depending on whether the connection destination is the forward transmission device 2a or the backward transmission device 2b. Note that the FPGA 10 is an example of an instruction unit.

Moreover, since the FPGA 10 acquires the setting information from the network monitoring control device 9, a load of the processing for switching the connection state of the optical switch 17 is reduced, for example, than a case where the setting information is manually input by a user. Note that the network monitoring control device 9 is an example of a monitoring control device.

Second Embodiment

The bidirectional transmission device 1 according to the first embodiment sets the connection state of the optical switch 17 according to the transmission setting from the network monitoring control device 9. However, the connection state of the optical switch 17 may be set without receiving the transmission setting by determining a reception state of the monitoring signal light S2c.

Figure 6:
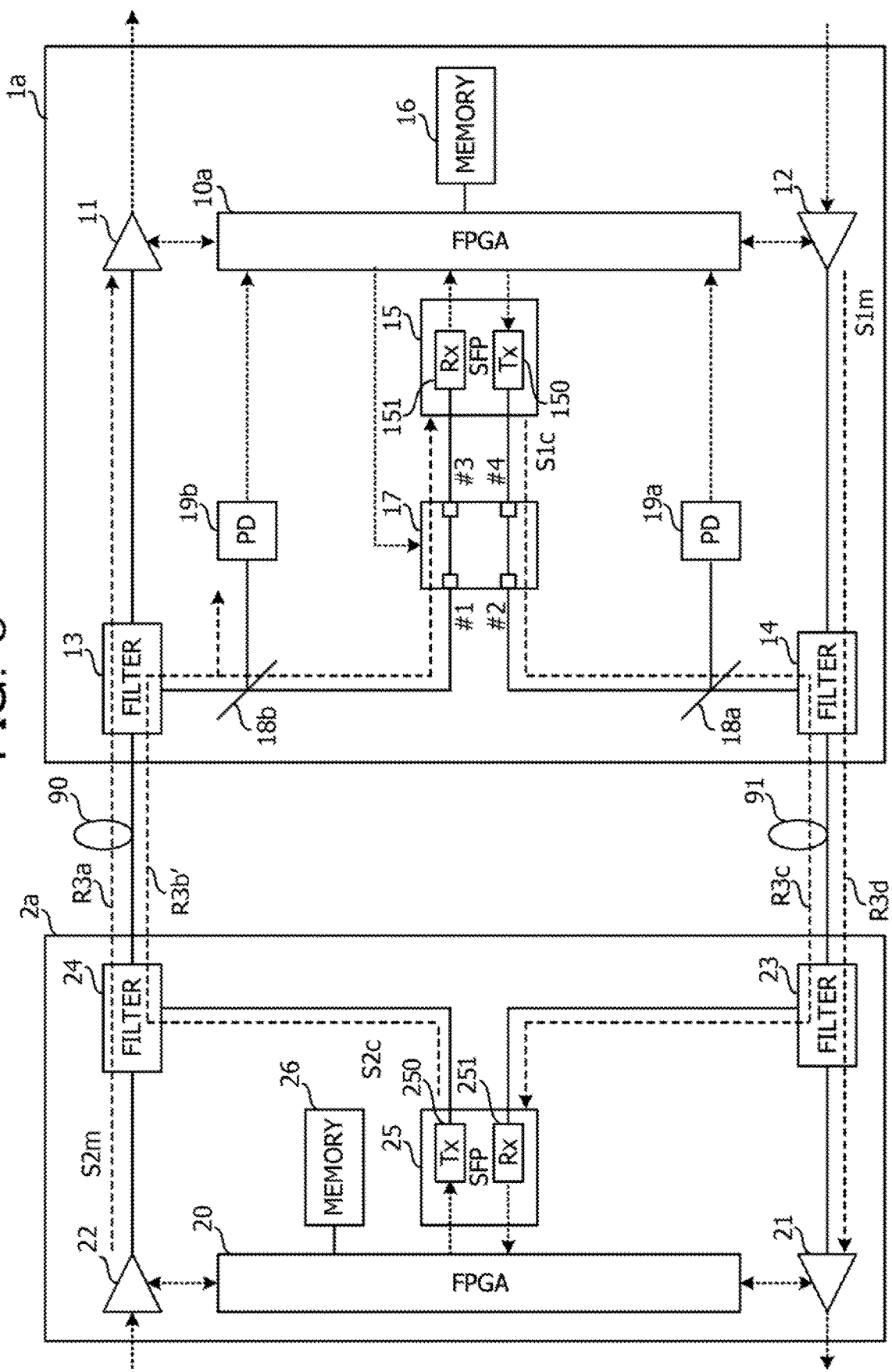
FIG. 6 is a configuration diagram illustrating an example of a transmission system, in which a bidirectional transmission device and a forward transmission device are connected to each other, according to a second embodiment.

FIG. 6 is a configuration diagram illustrating an example of a transmission system, in which a bidirectional transmission device 1a and a forward transmission device 2a are connected to each other, according to a second embodiment. In FIG. 6, the same components as those in FIGS. 1 and 3 are denoted by the same reference numerals, and description thereof will be omitted. Note that the bidirectional transmission device 1a is an example of a first transmission device.

The bidirectional transmission device 1a includes optical splitters 18a and 18b and PDs 19a and 19b in addition to the configuration of the bidirectional transmission device 1 according to the first embodiment. The optical splitter 18b is connected between a port #1 of an optical switch 17 and a filter 13, and the optical splitter 18a is connected between a port #2 of the optical switch 17 and a filter 14. Furthermore, the PDs 19a and 19b are respectively connected to the optical splitters 18a and 18b.

Furthermore, the bidirectional transmission device 1a includes an FPGA 10a instead of the FPGA 10. Although the FPGA 10a outputs a switching signal to the optical switch 17 in response to detection signals input from the PDs 19a and 19b, other functions of the FPGA 10a are the same as those of the FPGA 10.

FIG. 6 illustrates an operation of the bidirectional transmission device 1a in a case of being connected to the forward transmission device 2a. Monitoring signal light S2c transmitted by the forward transmission device 2a is transmitted to a transmission path 90 and input from the filter 13 to the port #1 of the optical switch 17.

A reference numeral R3b' indicates a path of the monitoring signal light S2c. The optical splitter 18b separates the monitoring signal light S2c input from the filter 13 and guides the light to the optical switch 17 and the PD 19b.

The PD 19b is an example of a second detection unit and detects the monitoring signal light S2c input from the transmission path 90 to the optical switch 17. The PD 19b outputs an electrical detection signal from the monitoring signal light S2c to the FPGA 10a. With this operation, the FPGA 10a can determine whether or not the monitoring signal light S2c is received from the forward transmission device 2a.

In a case where the detection signal is input from the PD 19b, the FPGA 10a sets the connection state of the optical switch 17 to the straight state. With this setting, the monitoring signal light S2c is input to the reception unit 151 via the optical switch 17. Therefore, the bidirectional transmission device 1a can receive the monitoring signal light S2c from the forward transmission device 2a.

Furthermore, the monitoring signal light S1c transmitted by the transmission unit 150 is input to the filter 14 via the optical switch 17. With this operation, the bidirectional transmission device 1a can transmit the monitoring signal light S1c to the forward transmission device 2a.

Furthermore, in a case where the bidirectional transmission device 1a is connected to the backward transmission device 2b, the monitoring signal light S2c is input to the PD 19a instead of the PD 19b. In a case where the detection signal is not input from the PD 19b and the detection signal is input from the PD 19a, the FPGA 10a sets the connection state of the optical switch 17 to the cross state.

Figure 7:
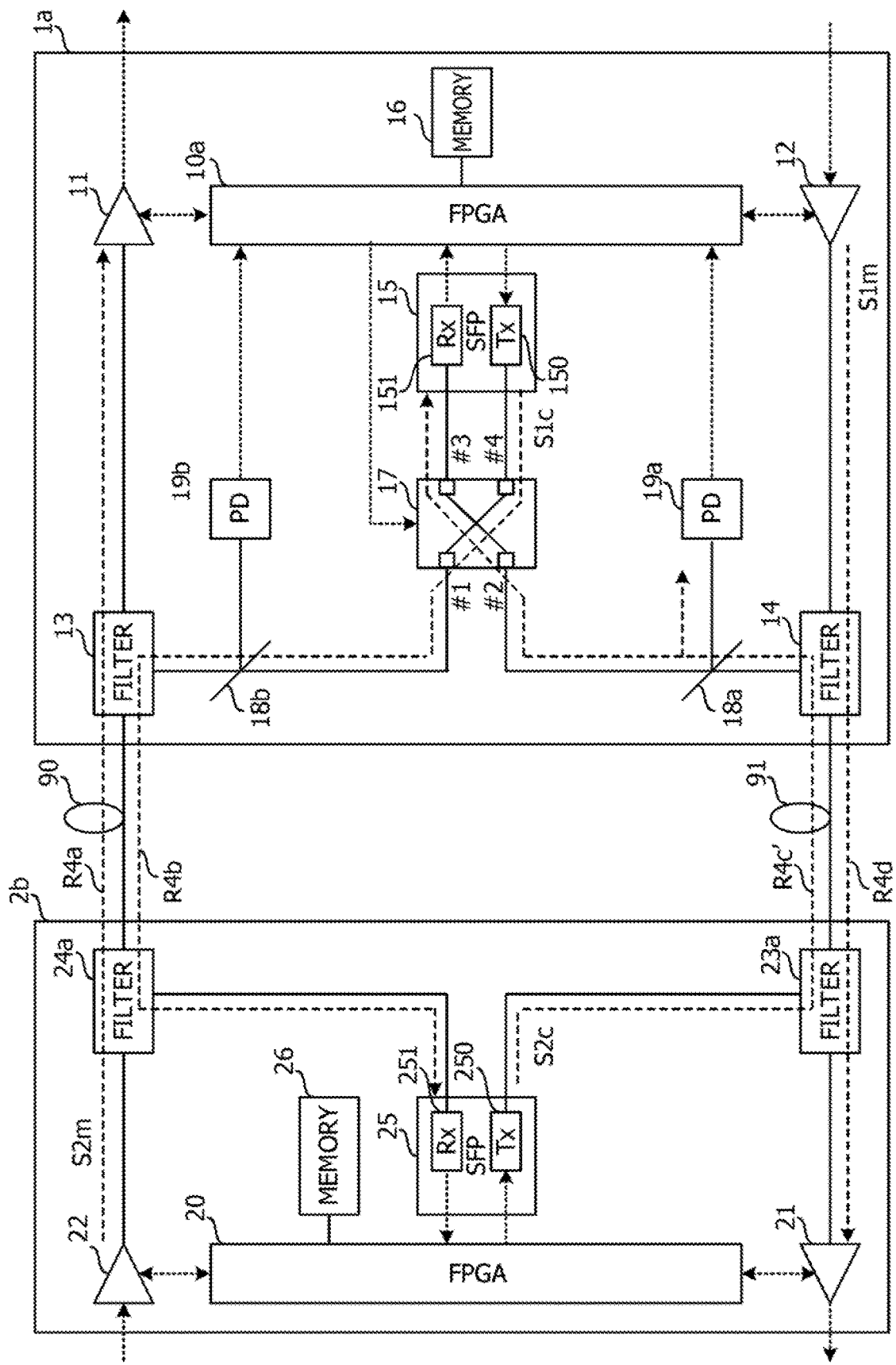
FIG. 7 is a configuration diagram illustrating an example of a transmission system, in which a bidirectional transmission device and a backward transmission device are connected to each other, according to the second embodiment.

FIG. 7 is a configuration diagram illustrating an example of a transmission system, in which the bidirectional transmission device 1a and the backward transmission device 2b are connected to each other, according to the second embodiment. In FIG. 7, the same components as those in FIGS. 4 and 6 are denoted by the same reference numerals, and description thereof will be omitted.

FIG. 7 illustrates an operation of the bidirectional transmission device 1a in a case of being connected to the backward transmission device 2b. The monitoring signal light S2c transmitted by the backward transmission device 2b is transmitted to the transmission path 91 and is input from the filter 14 to the port #2 of the optical switch 17.

A reference numeral R4c' indicates a path of the monitoring signal light S2c. The optical splitter 18a separates the monitoring signal light S2c input from the filter 14 and guides the light to the optical switch 17 and the PD 19a.

The PD 19a is an example of a first detection unit and detects the monitoring signal light S2c input from the transmission path 91 to the optical switch 17. The PD 19a outputs an electrical detection signal from the monitoring signal light S2c to the FPGA 10a. With this operation, the FPGA 10a can determine whether or not the monitoring signal light S2c is received from the backward transmission device 2b.

In a case where the detection signal is not input from the PD 19b and the detection signal is input from the PD 19a, the FPGA 10a sets the connection state of the optical switch 17 to the cross state. With this setting, the monitoring signal light S2c is input to the reception unit 151 via the optical switch 17. Therefore, the bidirectional transmission device 1a can receive the monitoring signal light S2c from the backward transmission device 2b.

Furthermore, the monitoring signal light S1c transmitted by the transmission unit 150 is input to the filter 13 via the optical switch 17. With this operation, the bidirectional transmission device 1a can transmit the monitoring signal light S1c to the backward transmission device 2b.

Figure 8:
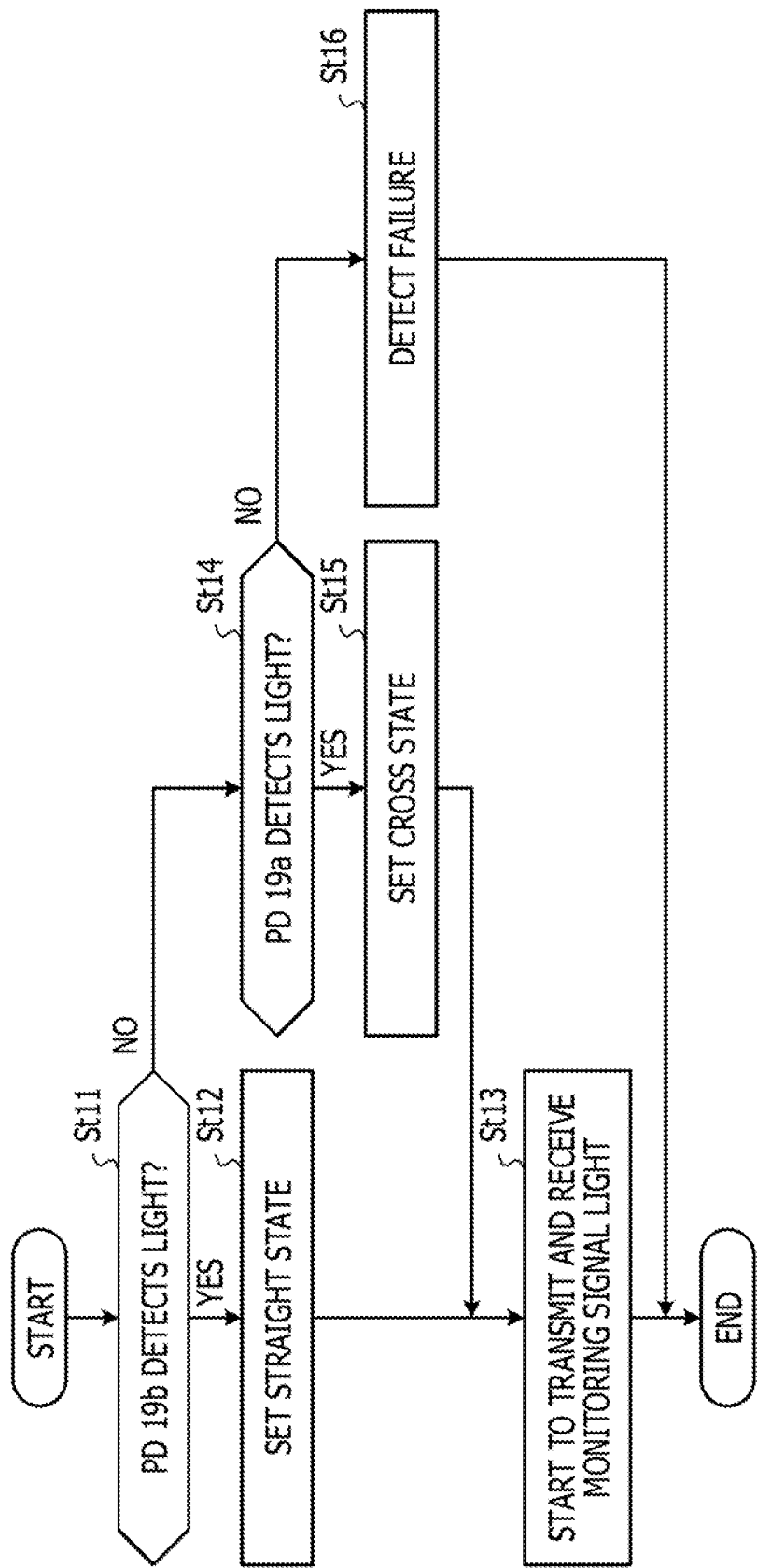
FIG. 8 is a flowchart illustrating an example of setting processing of an optical switch of the bidirectional transmission device according to the second embodiment.

FIG. 8 is a flowchart illustrating an example of setting processing of the optical switch 17 of the bidirectional transmission device 1a according to the second embodiment. This processing is a transmission method according to the embodiment. Note that, prior to the present processing, the forward transmission device 2a or the backward transmission device 2b to which the bidirectional transmission device 1a is connected starts to transmit the monitoring signal light S2c.

The FPGA 10a determines whether or not the PD 19b detects the monitoring signal light S2c on the basis of the detection signal input from the PD 19b (step St11). In a case where the PD 19b detects the monitoring signal light S2c (Yes in step St11), the FPGA 10a determines that the connection destination of the bidirectional transmission device 1a is the forward transmission device 2a and sets the connection state of the optical switch 17 to the straight state by a switching signal (step St12). Next, the FPGA 10a starts transmission and reception of the monitoring signal light S1c and S2c by the SFP 15 (step St13).

Furthermore, in a case where the PD 19b does not detect the monitoring signal light S2c (No in step St11), the FPGA 10a determines whether or not the PD 19a detects the monitoring signal light S2c on the basis of the detection signal input from the PD 19a (step St14). In a case where the PD 19a detects the monitoring signal light S2c (Yes in step St14), the FPGA 10a determines that the connection destination of the bidirectional transmission device 1a is the backward transmission device 2b and sets the connection state of the optical switch 17 to the cross state by the switching signal (step St15). Next, the FPGA 10a starts transmission and reception of the monitoring signal light S1c and S2c by the SFP 15 (step St13).

Furthermore, in a case where the PD 19a does not detect the monitoring signal light S2c (No in step St14), the FPGA 10a determines that the connection between the bidirectional transmission device 1a and the forward transmission device 2a or the backward transmission device 2b is abnormal (for example, disconnection of optical fiber or the like) and detects a failure (step St16). In this way, the setting processing of the optical switch 17 is executed.

In this way, the FPGA 10a instructs the optical switch 17 to switch the connection state on the basis of the detection results of the PDs 19a and 19b. Therefore, unlike the first embodiment, the FPGA 10a can autonomously set the connection state of the optical switch 17 depending on the kind of the device to which the bidirectional transmission device 1a is connected without receiving the transmission setting from the network monitoring control device 9.

Third Embodiment

Regarding the bidirectional transmission device 1 according to the first embodiment and the bidirectional transmission device 1a according to the second embodiment, for example, in a case where the SFP 15 has a failure, there is a possibility that both of the transmission and the reception of the monitoring signal light S1c and S2c to and from the forward transmission device 2a or the backward transmission device 2b that is the connection destination is not possible. Therefore, by redundantly including two SFPs 15a and 15b, in a case where one of the SFPs 15a and 15b has a failure, a bidirectional transmission device 1b according to the present embodiment can transmit monitoring signal light S1c or receive monitoring signal light S2c by the other one of the SFPs 15a and 15b that is normal.

Figure 9:
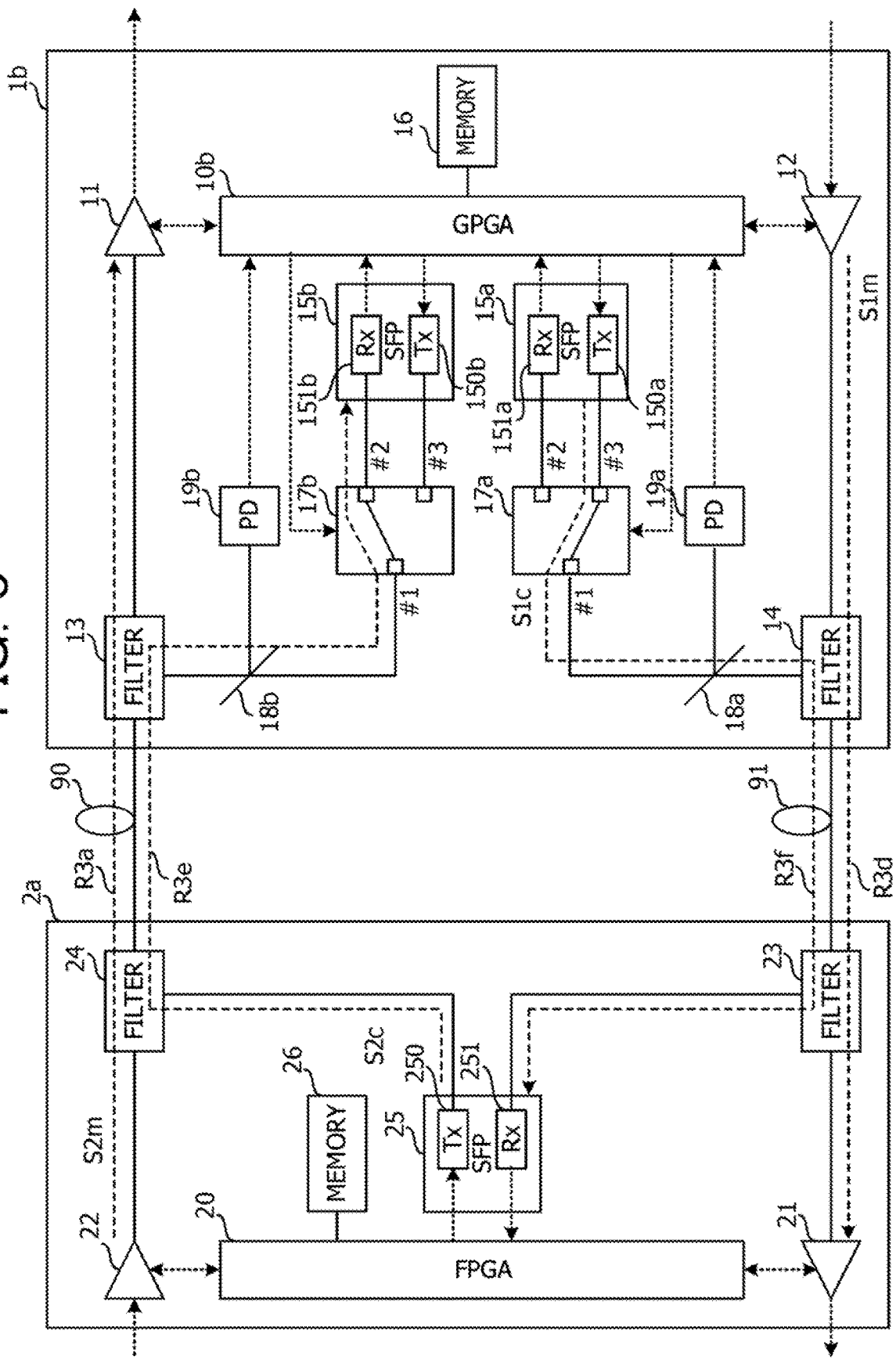
FIG. 9 is a configuration diagram illustrating an example of a transmission system in which a bidirectional transmission device and a forward transmission device according to a third embodiment are connected to each other.

FIG. 9 is a configuration diagram illustrating an example of a transmission system, in which the bidirectional transmission device 1b and the forward transmission device 2a are connected to each other, according to a third embodiment. In FIG. 9, the same components as those in FIG. 6 are denoted by the same reference numerals, and description thereof will be omitted. Note that the bidirectional transmission device 1b is an example of a first transmission device.

The bidirectional transmission device 1b includes two optical switches 17a and 17b each and the SFPs 15a and 15b instead of the optical switch 17 and the SFP 15 in the second embodiment. The SFPs 15a and 15b have the similar configuration to the SFP 15. The SFP 15a includes a transmission unit 150a and a reception unit 151a. The SFP 15b includes a transmission unit 150b and a reception unit 151b.

Each of the transmission units 150a and 150b transmits the monitoring signal light S1c to the forward transmission device 2a. The transmission unit 150a is an example of a first transmission unit, and the transmission unit 150b is an example of a second transmission unit.

Each of the reception units 151a and 151b receives the monitoring signal light S2c from the forward transmission device 2a. The reception unit 151a is an example of a first reception unit, and the reception unit 151b is an example of a second reception unit.

Each of the optical switches 17a and 17b includes 1×2 ports #1 to #3. The port #1 of the optical switch 17a is connected to the optical splitter 18a, the port #2 of the optical switch 17a is connected to the reception unit 151a, and the port #3 of the optical switch 17a is connected to the transmission unit 150a.

The port #1 of the optical switch 17b is connected to the optical splitter 18b, the port #2 of the optical switch 17b is connected to the reception unit 151b, and the port #3 of the optical switch 17b is connected to the transmission unit 150b. Note that the optical switch 17a is an example of a first optical switch, and the optical switch 17b is an example of a second optical switch.

The optical switch 17a switches a connection destination of the port #1 to the port #2 or the port #3 according to the switching signal from an FPGA 10b. In a case where the ports #1 and #2 of the optical switch 17a are connected to each other, a transmission path 91 and the reception unit 151a are optically connected to each other via a filter 14 and the optical splitter 18a.

Furthermore, in a case where the ports #1 and #3 of the optical switch 17a are connected to each other, a transmission path 91 and the transmission unit 150a are optically connected to each other via the filter 14 and the optical splitter 18a. Therefore, the optical switch 17a can switch the connection destination of the transmission path 91 to the reception unit 151a or the transmission unit 150a.

The optical switch 17b switches the connection destination of the port #1 to the port #2 or the port #3 according to the switching signal from the FPGA 10b. In a case where the ports #1 and #2 of the optical switch 17b are connected to each other, the transmission path 90 and the reception unit 151b are optically connected to each other via the filter 13 and the optical splitter 18b.

Furthermore, in a case where the ports #1 and #3 of the optical switch 17b are connected to each other, the transmission path 90 and the transmission unit 150b are optically connected to each other via the filter 13 and the optical splitter 18b. Therefore, the optical switch 17b can switch the connection destination of the transmission path 90 to the reception unit 151b or the transmission unit 150b.

Furthermore, the bidirectional transmission device 1b includes the FPGA 10b instead of the FPGA 10. The FPGA 10b switches the connection states between the ports #1 to #3 of the optical switches 17a and 17b by a switching signal according to the detection signals from the PDs 19a and 19b. Note that the other functions of the FPGA 10b are similar to those of the FPGA 10.

FIG. 9 illustrates an operation of the bidirectional transmission device 1b in a case of being connected to the forward transmission device 2a. Monitoring signal light S2c transmitted by the forward transmission device 2a is transmitted to the transmission path 90 and input from the filter 13 to the port #1 of the optical switch 17b.

A reference numeral R3e indicates a path of the monitoring signal light S2c. The filter 13 guides the monitoring signal light S2c from the transmission path 90 to the optical switch 17b. The optical splitter 18b separates the monitoring signal light S2c input from the filter 13 and guides the light to the optical switch 17b and the PD 19b.

In a case where the detection signal is input from the PD 19b, the FPGA 10b sets the ports #1 and #2 of the optical switch 17b to be in the connection state by the switching signal. With this operation, the transmission path 90 and the reception unit 151b are optically connected to each other. Therefore, the monitoring signal light S2c is input to the reception unit 151b via the ports #1 and #2 of the optical switch 17b. Therefore, the bidirectional transmission device 1b can receive the monitoring signal light S2c from the forward transmission device 2a.

Furthermore, in a case where the detection signal is input from the PD 19b, the FPGA 10b sets the ports #1 and #3 of the optical switch 17a to be in the connection state by the switching signal. With this operation, the transmission path 91 and the transmission unit 150a are optically connected to each other. Therefore, the monitoring signal light S1c transmitted by the transmission unit 150a is input to the filter 14 via the ports #3 and #1 of the optical switch 17a.

A reference numeral R3f indicates a path of the monitoring signal light S1c. The filter 14 guides the monitoring signal light S1c input from the optical switch 17a to the transmission path 91. With this operation, the bidirectional transmission device 1b can transmit the monitoring signal light S1c to the forward transmission device 2a.

In this way, the optical switch 17a switches the connection destination of the transmission path 91 to the transmission unit 150a and the optical switch 17b switches the connection destination of the transmission path 90 to the reception unit 151b so that the bidirectional transmission device 1b can transmit and receive main signal light S1m and S2m and the monitoring signal light S1c and S2c to and from the forward transmission device 2a. At this time, the transmission directions of the main signal light S1m and the monitoring signal light S1c in the transmission path 91 are the same, and the transmission directions of the main signal light S2m and the monitoring signal light S2c in the transmission path 90 are the same.

Furthermore, in a case where the bidirectional transmission device 1b is connected to the backward transmission device 2b, the monitoring signal light S2c is input to the PD 19a instead of the PD 19b. In a case where the detection signal is not input from the PD 19b and the detection signal is input from the PD 19a, the FPGA 10b sets the ports #1 and #2 of the optical switch 17a to be in the connection state and sets the ports #1 and #3 of the optical switch 17b to be in the connection state.

Figure 10:
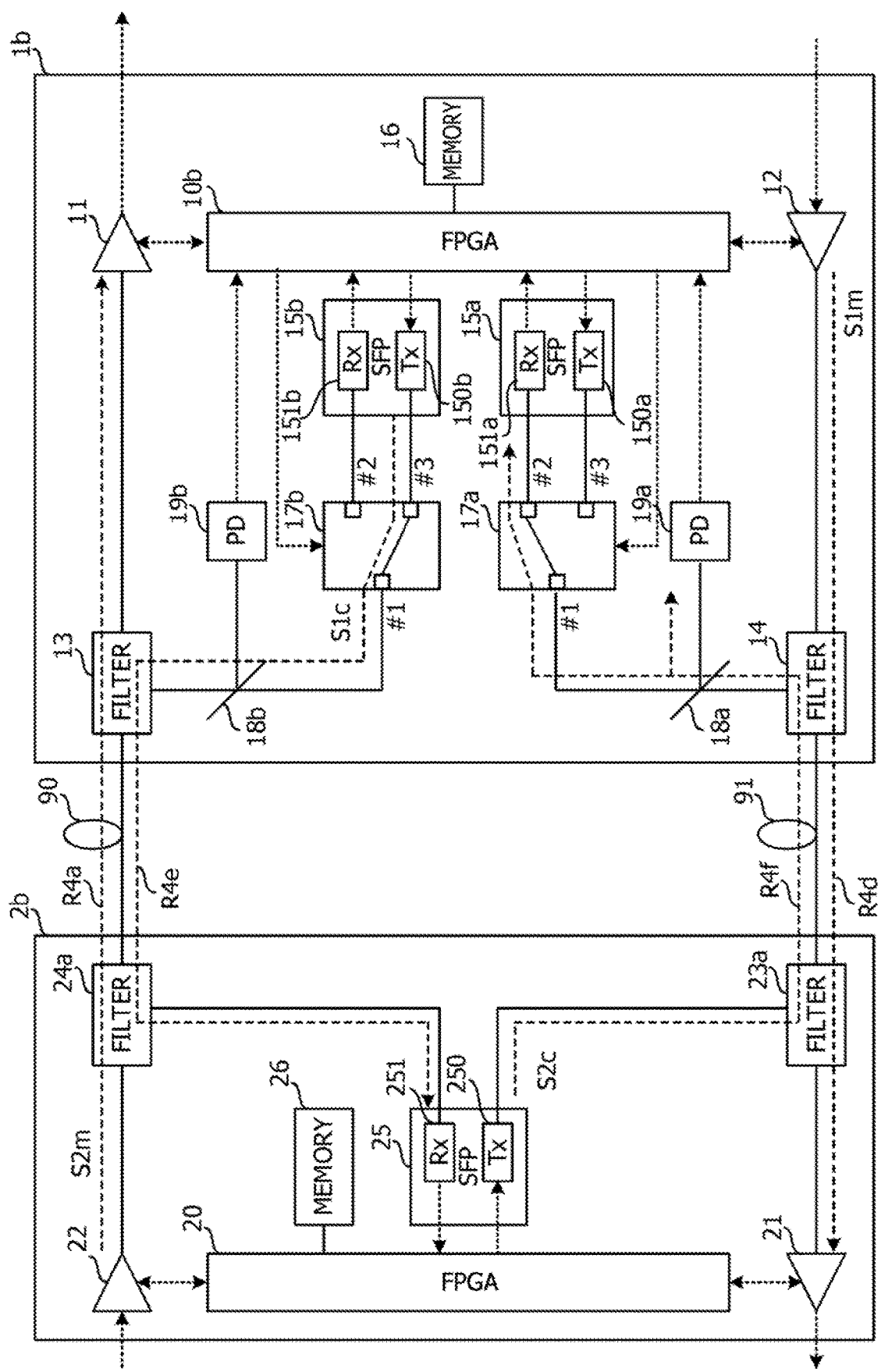
FIG. 10 is a configuration diagram illustrating an example of a transmission system, in which a bidirectional transmission device and a backward transmission device are connected to each other, according to the third embodiment.

FIG. 10 is a configuration diagram illustrating an example of a transmission system, in which the bidirectional transmission device 1b and the backward transmission device 2b are connected to each other, according to the third embodiment. In FIG. 10, the same components as those in FIG. 9 are denoted by the same reference numerals, and description thereof will be omitted.

FIG. 10 illustrates an operation of the bidirectional transmission device 1b in a case of being connected to the backward transmission device 2b. Each of the transmission units 150a and 150b transmits the monitoring signal light S1c to the backward transmission device 2b. Each of the reception units 151a and 151b receives the monitoring signal light S2c from the backward transmission device 2b.

A reference numeral R4f is a path of the monitoring signal light S2c. The monitoring signal light S2c transmitted by the backward transmission device 2b is input from the transmission path 91 to the filter 14. The filter 14 guides the monitoring signal light S2c from the transmission path 91 to the optical splitter 18a. The optical splitter 18a separates the monitoring signal light S2c input from the filter 14 and guides the light to the optical switch 17a and the PD 19a.

In a case where the detection signal is input from the PD 19a, the FPGA 10b sets the ports #1 and #2 of the optical switch 17a to be in the connection state by the switching signal. With this operation, the transmission path 91 and the reception unit 151a are optically connected to each other. Therefore, the monitoring signal light S2c is input to the reception unit 151a via the ports #1 and #2 of the optical switch 17a. Therefore, the bidirectional transmission device 1b can receive the monitoring signal light S2c from the backward transmission device 2b.

Furthermore, in a case where the detection signal is input from the PD 19a, the FPGA 10b sets the ports #1 and #3 of the optical switch 17b to be in the connection state by the switching signal. With this operation, the transmission path 90 and the transmission unit 150b are optically connected to each other. Therefore, the monitoring signal light S1c transmitted by the transmission unit 150b is input to the filter 13 via the ports #3 and #1 of the optical switch 17b.

A reference numeral R4e indicates a path of the monitoring signal light S1c. The filter 13 guides the monitoring signal light S1c input from the optical switch 17b to the transmission path 90. With this operation, the bidirectional transmission device 1b can transmit the monitoring signal light S1c to the backward transmission device 2b.

In this way, the optical switch 17a switches the connection destination of the transmission path 91 to the reception unit 151a and the optical switch 17b switches the connection destination of the transmission path 90 to the transmission unit 150b so that the bidirectional transmission device 1b can transmit and receive the main signal light S1m and S2m and the monitoring signal light S1c and S2c to and from the backward transmission device 2b. At this time, the transmission directions of the main signal light S1m and the monitoring signal light S2c in the transmission path 91 are opposite to each other, and the transmission directions of the main signal light S2m and the monitoring signal light S1c in the transmission path 90 are opposite to each other.

Therefore, the bidirectional transmission device 1 can switch the transmission direction of the monitoring signal light S1c and S2c with respect to the main signal light S1m and S2m by switching performed by the optical switches 17a and 17b.

With this operation, the bidirectional transmission device 1b can transmit and receive the main signal light S1m and S2m and the monitoring signal light S1c and S2c to and from both of the forward transmission device 2a and the backward transmission device 2b. For example, the bidirectional transmission device 1b has connection compatibility with the forward transmission device 2a and the backward transmission device 2b.

Therefore, the bidirectional transmission device 1b can relax limitation in combinations of the transmission devices that can be connected to each other in the network.

Figure 11:
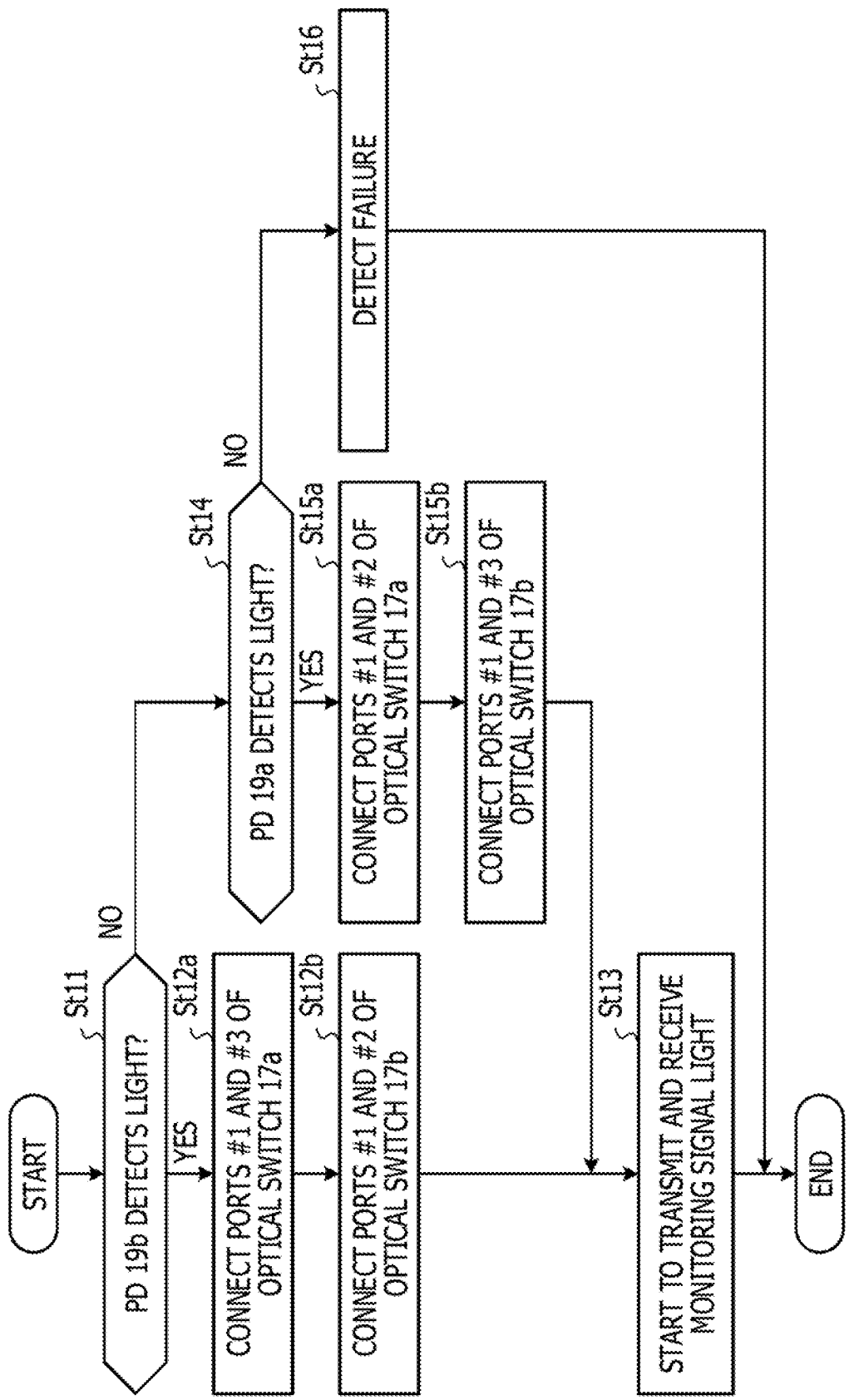
FIG. 11 is a flowchart illustrating an example of setting processing of an optical switch of the bidirectional transmission device according to the third embodiment.

FIG. 11 is a flowchart illustrating an example of setting processing of the optical switches 17a and 17b of the bidirectional transmission device 1b according to the third embodiment. In FIG. 11, the processing same as that in FIG. 8 is denoted by the same reference numeral, and description thereof will be omitted.

This processing is a transmission method according to the embodiment. Note that, prior to the present processing, the forward transmission device 2a or the backward transmission device 2b to which the bidirectional transmission device 1a is connected starts to transmit the monitoring signal light S2c.

In a case where the PD 19b detects the monitoring signal light S2c (Yes in step St11), the FPGA 10b determines that the connection destination of the bidirectional transmission device 1a is the forward transmission device 2a, sets the ports #1 and #3 of the optical switch 17a to be in the connection state (step St12a), and sets the ports #1 and #2 of the optical switch 17b to be in the connection state (step St12b). Note that step St12b may be executed before step St12a. Thereafter, step St13 is executed.

Furthermore, in a case where the PD 19a detects the monitoring signal light S2c (Yes in step St14), the FPGA 10b determines that the connection destination of the bidirectional transmission device 1a is the backward transmission device 2b, sets the ports #1 and #2 of the optical switch 17a to be in the connection state (step St15a), and sets the ports #1 and #3 of the optical switch 17b to be in the connection state (step St15b). Note that step St15b may be executed before step St15a. Thereafter, step St13 is executed. In this way, the setting processing of the optical switches 17a and 17b is executed.

In this way, the FPGA 10b instructs the optical switches 17a and 17b to switch the connection state on the basis of the detection results of the PDs 19a and 19b. Therefore, as in the second embodiment, the FPGA 10b can autonomously set the connection state of the optical switch 17 depending on the kind of the device to which the bidirectional transmission device 1b is connected without receiving the transmission setting from a network monitoring control device 9. Note that, as in the first embodiment, the FPGA 10b may receive the transmission setting from the network monitoring control device 9 and instruct the optical switches 17a and 17b to switch the connection state according to the transmission setting.

Fourth Embodiment

In the first to the third embodiments, the wavelength bands of the main signal light S1m and the main signal light S2m are different from the wavelength bands of the monitoring signal light S1c and the monitoring signal light S2c. However, in a case where the wavelength bands of the main signal light S1m and the main signal light S2m are respectively opposite to the transmission directions of the monitoring signal light S1c and the monitoring signal light S2c, each wavelength bands may be the same. In a case where the wavelength band of the monitoring signal light S1c and S2c and the wavelength band of the main signal light S1m and S2m are the same, there is a vacant resource in an available wavelength band. Therefore, it is possible to allocate the vacant wavelength band to the main signal light S1m and S2m or the Raman excitation light source.

Note that, in the following example, a transmission unit 250 of a forward transmission device 2a transmits S-band monitoring signal light S2c, and a reception unit 251 of the forward transmission device 2a receives S-band monitoring signal light S1c. Furthermore, a transmission unit 250 of a backward transmission device 2b transmits C-band monitoring signal light S2c, and a reception unit 251 of the backward transmission device 2b receives C-band monitoring signal light S1c.

Figure 12:
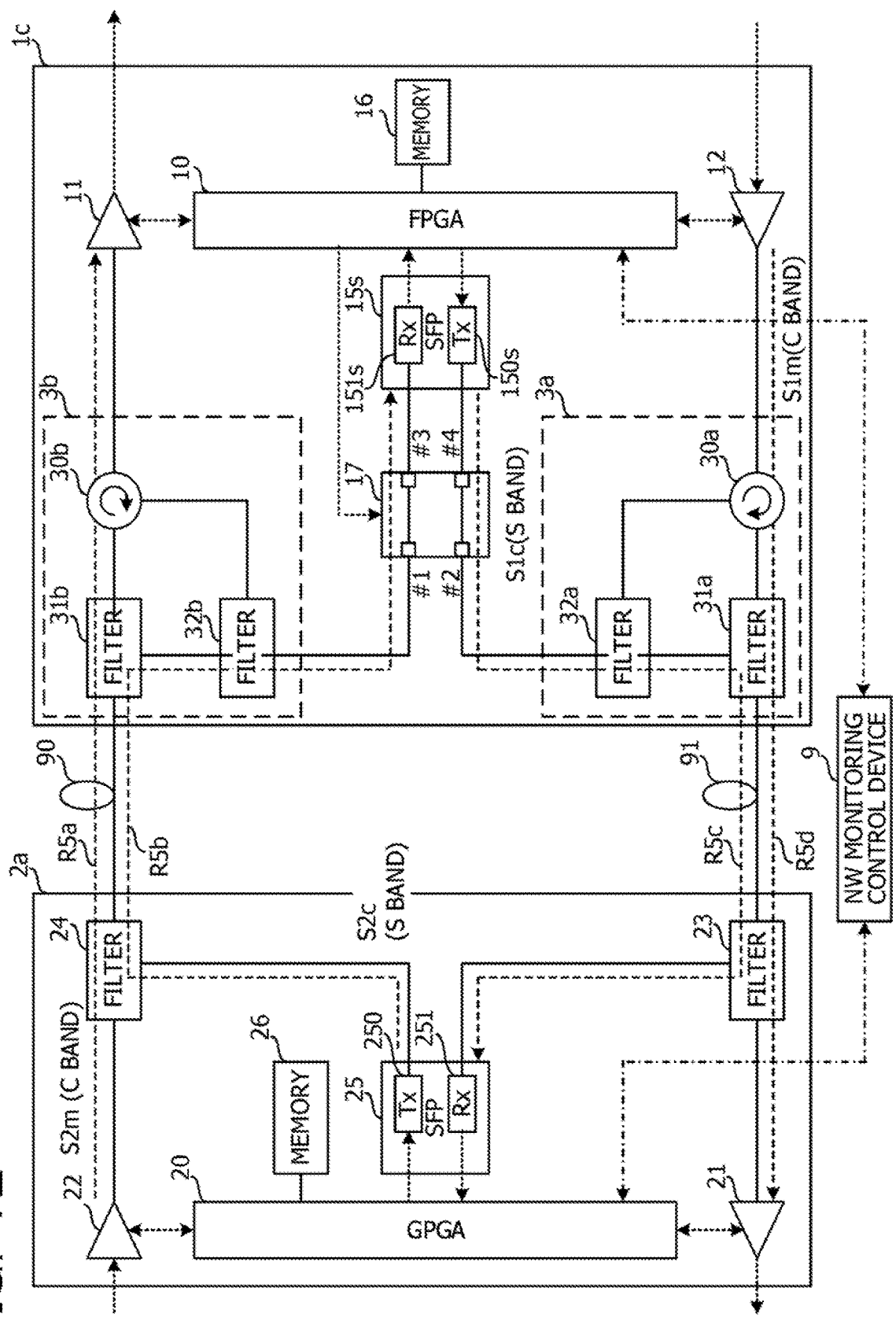
FIG. 12 is a configuration diagram illustrating an example of a transmission system, in which a bidirectional transmission device and a forward transmission device are connected to each other, according to a fourth embodiment.

FIG. 12 is a configuration diagram illustrating an example of a transmission system, in which a bidirectional transmission device 1c and the forward transmission device 2a are connected to each other, according to a fourth embodiment. In FIG. 12, the same components as those in FIG. 3 are denoted by the same reference numerals, and description thereof will be omitted. Note that the bidirectional transmission device 1c is an example of a first transmission device.

A reference numeral R5d indicates a path of the main signal light S1m. The bidirectional transmission device is transmits, for example, C-band (1550 (nm) band) main signal light S1m to the forward transmission device 2a via a transmission path 91. The forward transmission device 2a receives the main signal light S1m.

A reference numeral R5a indicates a path of the main signal light S2m. The forward transmission device 2a transmits, for example, C-band main signal light S2m to the bidirectional transmission device is via a transmission path 90. The bidirectional transmission device is receives the main signal light S2m. Note that the C band is an example of a first wavelength band.

The bidirectional transmission device is includes a waveguide 3a instead of the filter 14 and a waveguide 3b instead of the filter 13. The waveguide 3a is an example of a first waveguide and is connected between the transmission path 91 and an optical switch 17.

The waveguide 3a includes filters 31a and 32a and a circulator 30a that are optically connected to each other. The filter 31a is optically connected to the transmission path 91, the filter 32a is optically connected to a port #2 of the optical switch 17, and the circulator 30a is optically connected to an optical amplifier 12.

The waveguide 3b is an example of a second waveguide and is connected between the transmission path 90 and the optical switch 17. The waveguide 3b includes filters 31b and 32b and a circulator 30b that are optically connected to each other. The filter 31b is optically connected to the transmission path 90, the filter 32b is optically connected to the port #1 of the optical switch 17, and the circulator 30b is optically connected to an optical amplifier 11.

Furthermore, the bidirectional transmission device is includes, for example, an SFP 15s that transmits and receives S-band (1510 (nm) band) monitoring signal light S1c and S2c instead of the SFP 15. The SFP 15s has a similar function to the SFP 15 and is detachable from the bidirectional transmission device 1c. The SFP 15s includes a transmission unit 150s and a reception unit 151s.

The transmission unit 150s transmits the S-band monitoring signal light S1c, and the reception unit 151s receives the S-band monitoring signal light S2c. The transmission unit 150s is optically connected to a port #4 of the optical switch 17, and the reception unit 151s is optically connected to a port #3 of the optical switch 17. Note that the S band is an example of a second wavelength band.

FIG. 12 illustrates an operation of the bidirectional transmission device 1c in a case of being connected to the forward transmission device 2a. Since a connection destination is the forward transmission device 2a, an FPGA 10 sets the connection state of the optical switch 17 to a straight state as described above.

A reference numeral R5c indicates a path of the monitoring signal light S1c. The monitoring signal light S1c is input from the transmission unit 150s to the filter 32a via the ports #4 and #2 of the optical switch 17. The filter 32a guides the monitoring signal light S1c to the filter 31a, and the filter 31a guides the monitoring signal light S1c to the transmission path 91.

With this operation, the bidirectional transmission device 1c transmits the monitoring signal light S1c to the forward transmission device 2a. Note that, as the filters 31a and 32a, for example, an optical filter that has a wavelength multiplexing and separating function is exemplified. However, the filters 31a and 32a are not limited to this.

Furthermore, the circulator 30a guides the main signal light S1m to the filter 31a. At this time, the main signal light S1m is not input from the circulator 30a to the filter 32a. The filter 32a guides the main signal light S1m to the transmission path 91. With this operation, the bidirectional transmission device 1c transmits the main signal light S1m to the forward transmission device 2a.

A reference numeral R5b indicates a path of the monitoring signal light S2c. The monitoring signal light S2c transmitted by the forward transmission device 2a is input from the transmission path 90 to the filter 31b. The filter 31b guides the monitoring signal light S2c to the filter 32b, and the filter 32*b* guides the monitoring signal light S2*c* to the optical switch 17. The monitoring signal light S2*c* is input to the reception unit 151*s* via the ports #1 and #3 of the optical switch 17.

With this operation, the bidirectional transmission device 1*c* receives the monitoring signal light S2*c* from the forward transmission device 2*a*. Note that, as the filters 31*b* and 32*b*, for example, an optical filter that has a wavelength multiplexing and separating function is exemplified. However, the filters 31*b* and 32*b* are not limited to this.

Furthermore, the filter 31*b* guides the main signal light S2*m* transmitted by the forward transmission device 2*a* from the transmission path 90 to the circulator 30*b*. The circulator 30*b* guides the main signal light S2*m* to the optical amplifier 11. At this time, the main signal light S2*m* is not input from the circulator 30*b* to the filter 32*b*. With this operation, the bidirectional transmission device is receives the main signal light S2*m* from the forward transmission device 2*a*.

Next, a transmission system in which a backward transmission device 2*b* and the bidirectional transmission device 1*c* are connected to each other will be described.

Figure 13:
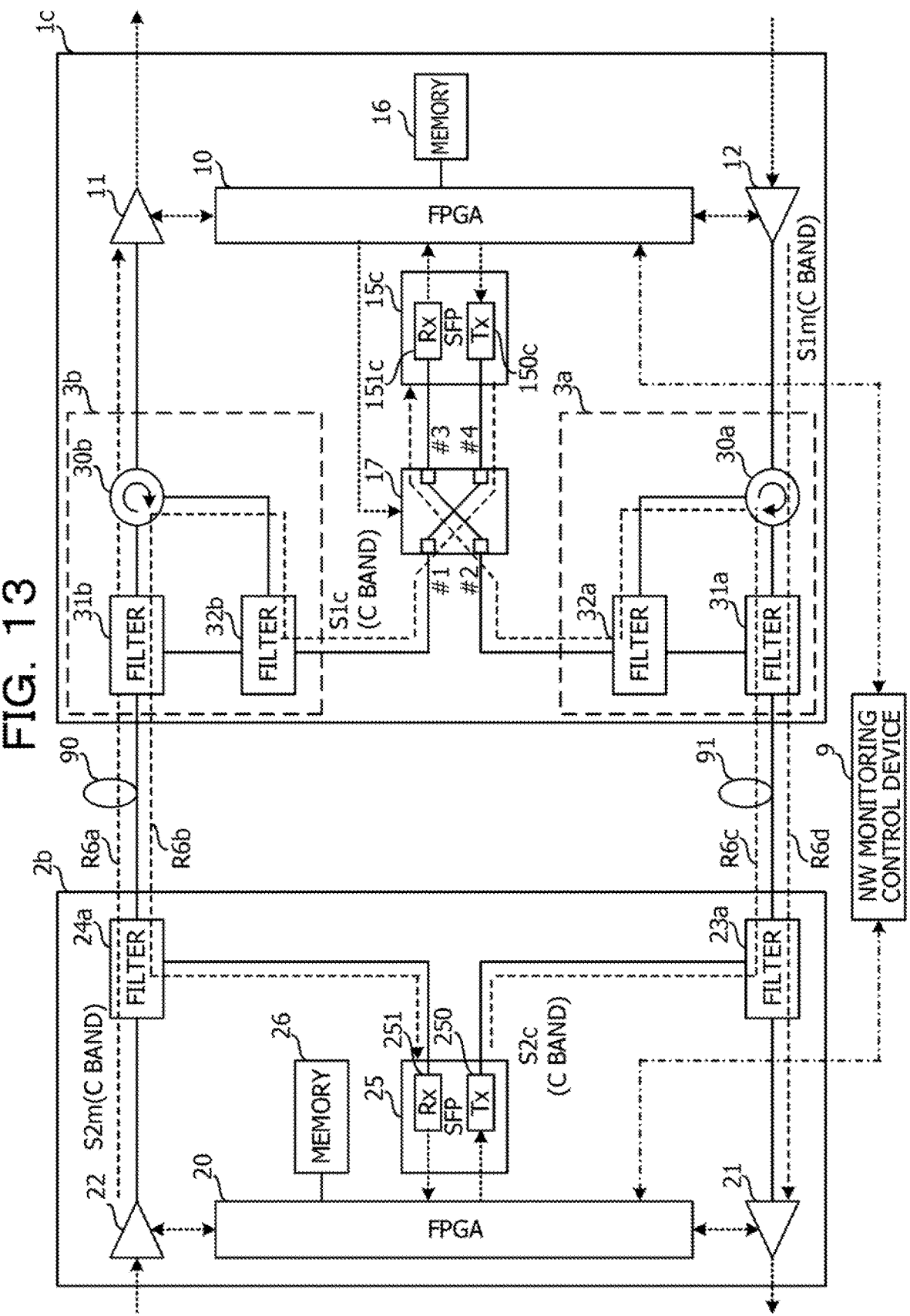
FIG. 13 is a configuration diagram illustrating an example of a transmission system, in which a bidirectional transmission device and a backward transmission device are connected to each other, according to the fourth embodiment.

FIG. 13 is a configuration diagram illustrating an example of a transmission system, in which the bidirectional transmission device 1*c* and the backward transmission device 2*b* are connected to each other, according to the fourth embodiment. In FIG. 13, the same components as those in FIG. 12 are denoted by the same reference numerals, and description thereof will be omitted.

A reference numeral R6*d* indicates a path of the main signal light S1*m*. The bidirectional transmission device is transmits, for example, C-band main signal light S1*m* to the backward transmission device 2*b* via the transmission path 91. The backward transmission device 2*b* receives the main signal light S1*m*.

A reference numeral R6*a* indicates a path of the main signal light S2*m*. The backward transmission device 2*b* transmits, for example, C-band main signal light S2*m* to the bidirectional transmission device is via the transmission path 90. The bidirectional transmission device is receives the main signal light S2*m*.

Furthermore, the bidirectional transmission device is includes an SFP 15*c* that transmits and receives the C-band monitoring signal light S1*c* and S2*c* instead of the SFP 15*s*. The SFP 15*c* has a similar function to the SFP 15 and is detachable from the bidirectional transmission device 1*c*. The SFP 15*c* includes a transmission unit 150*c* and a reception unit 151*c*.

The transmission unit 150*c* transmits the C-band monitoring signal light S1*c*, and the reception unit 151*c* receives the C-band monitoring signal light S2*c*. The transmission unit 150*c* is optically connected to a port #4 of the optical switch 17, and the reception unit 151*c* is optically connected to a port #3 of the optical switch 17.

FIG. 13 illustrates an operation of the bidirectional transmission device 1*c* in a case of being connected to the backward transmission device 2*b*. Since the connection destination is the backward transmission device 2*b*, the FPGA 10 sets the connection state of the optical switch 17 to the cross state as described above.

A reference numeral R6*b* indicates a path of the monitoring signal light S1*c*. The monitoring signal light S1*c* is input from the transmission unit 150*c* to the filter 32*b* via the ports #4 and #1 of the optical switch 17. The filter 32*b* guides the monitoring signal light S1*c* to the filter 31*b*, and the filter 31*b* guides the monitoring signal light S1*c* to the transmission path 90. With this operation, the bidirectional transmission device is transmits the monitoring signal light S1*c* to the backward transmission device 2*b*.

A reference numeral R6*c* indicates a path of the monitoring signal light S2*c*. The C-band monitoring signal light S2*c* transmitted by the backward transmission device 2*b* is input from the transmission path 91 to the filter 31*a*. The filter 31*a* guides the monitoring signal light S2*c* to the filter 32*a*, and the filter 32*a* guides the monitoring signal light S2*c* to the optical switch 17. The monitoring signal light S2*c* is input to the reception unit 151*c* via the ports #2 and #3 of the optical switch 17. With this operation, the bidirectional transmission device 1*c* receives the monitoring signal light S2*c* from the backward transmission device 2*b*.

In this way, the waveguide 3*a* guides the S-band monitoring signal light S1*c* input from the optical switch 17 to the transmission path 91 and guides the C-band monitoring signal light S2*c* from the transmission path 91 to the optical switch 17. Furthermore, the waveguide 3*b* guides the C-band monitoring signal light S1*c* input from the optical switch 17 to the transmission path 90 and guides the S-band monitoring signal light S2*c* from the transmission path 90 to the optical switch 17.

Since the SFPs 15*s* and 15*c* are detachable, in a case where the connection destination is the forward transmission device 2*a*, the bidirectional transmission device is can use the SFP 15*s* that transmits and receives the S-band monitoring signal light S1*c*, and in a case where the connection destination is the backward transmission device 2*b*, the bidirectional transmission device is can use the SFP 15*c* that transmits and receives the C-band monitoring signal light S1*c*.

Furthermore, the optical switch 17 switches the connection state to the straight state or the cross state. By switching the connection state of the optical switch 17 as described above, the bidirectional transmission device 1*c* can transmit and receive the S-band monitoring signal light S1*c* and S2*c* to and from the forward transmission device 2*a* and can transmit and receive the C-band monitoring signal light S1*c* and S2*c* to and from the backward transmission device 2*b*.

Therefore, the bidirectional transmission device is can relax limitation in combinations of the transmission devices that can be connected to each other in the network. Furthermore, in a case where the connection destination is the backward transmission device 2*b*, the bidirectional transmission device 1*c* does not use the S band for the monitoring signal light S1*c* and S2*c*. Therefore, it is possible to allocate an unused S band to the main signal light S1*m* and S2*m* or Raman excitation light source.

Fifth Embodiment

In the fourth embodiment, in a case where the connection destination of the bidirectional transmission device 1*c* is the forward transmission device 2*a*, the SFP 15*s* compatible with the S band is used for the bidirectional transmission device 1*c*, and in a case where the connection destination of the bidirectional transmission device 1*c* is the backward transmission device 2*b*, the SFP 15*c* compatible with the C band is used. Therefore, it takes labor to replace the two kinds of SFPs 15*s* and 15*c* depending on the kind of the connection destination device.

Therefore, the bidirectional transmission device 1*d* according to the present embodiment includes the two kinds of SFPs 15*s* and 15*c* so as to save the labor to replace the SFPs 15*s* and 15*c*.

Figure 14:
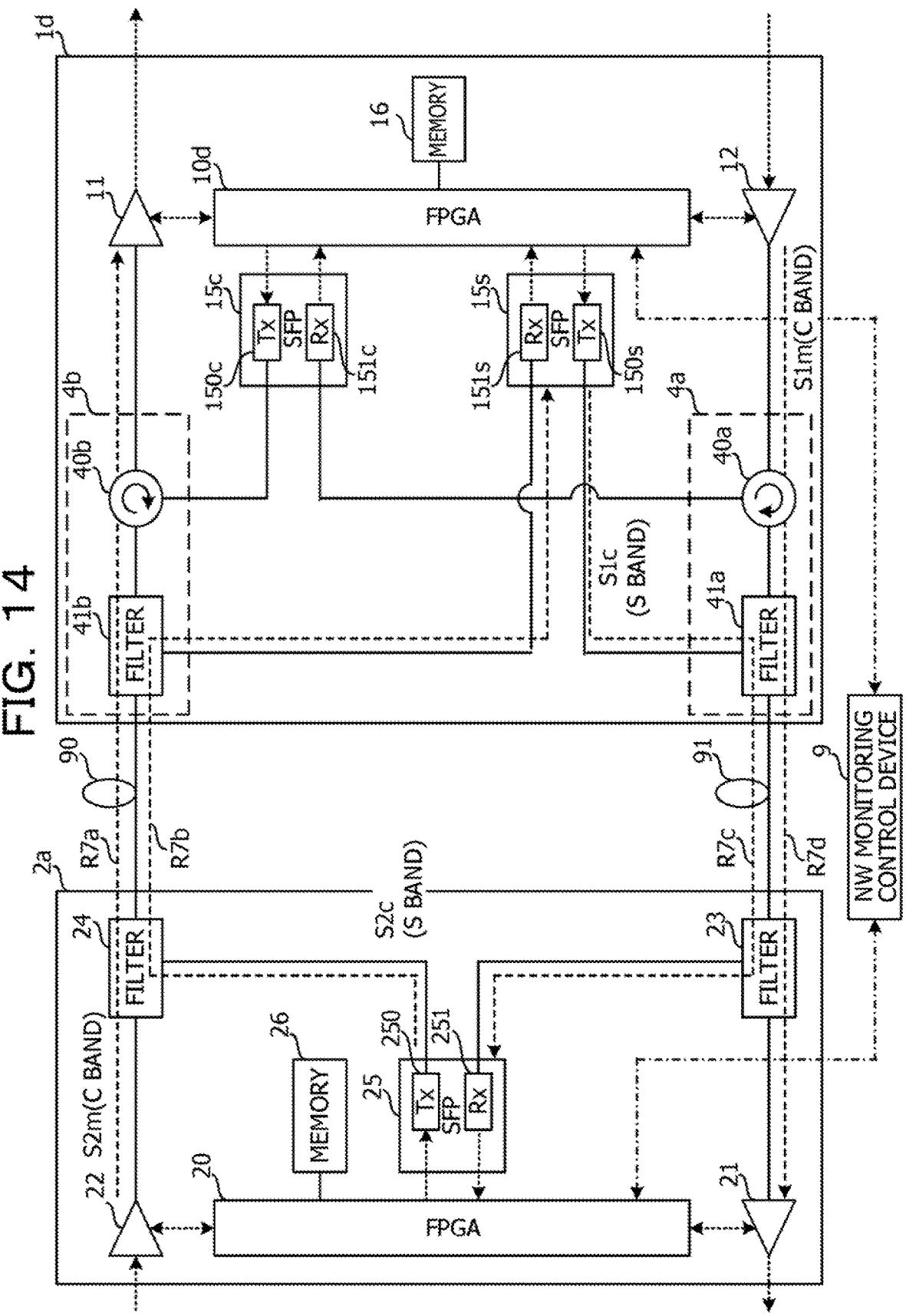
FIG. 14 is a configuration diagram illustrating an example of a transmission system, in which a bidirectional transmission device and a forward transmission device are connected to each other, according to a fifth embodiment.

FIG. 14 is a configuration diagram illustrating an example of a transmission system, in which a bidirectional transmission device 1d and the forward transmission device 2a are connected to each other, according to a fifth embodiment. In FIG. 14, the same components as those in FIGS. 12 and 13 are denoted by the same reference numerals, and description thereof will be omitted. Note that the bidirectional transmission device 1d is an example of a first transmission device.

A reference numeral R7d indicates a path of main signal light S1m. The bidirectional transmission device 1d transmits, for example, C-band main signal light S1m to the forward transmission device 2a via a transmission path 91. The forward transmission device 2a receives the main signal light S1m.

A reference numeral R7a indicates a path of main signal light S2m. The forward transmission device 2a transmits, for example, C-band main signal light S2m to the bidirectional transmission device 1d via a transmission path 90. The bidirectional transmission device 1d receives the main signal light S2m.

The bidirectional transmission device 1d includes a waveguide 4a instead of the waveguide 3a and includes a waveguide 4b instead of the waveguide 3b. The waveguide 4a is an example of a third waveguide and includes a filter 41a and a circulator 40a that are optically connected to each other. The filter 41a is optically connected to the transmission path 91 and a transmission unit 150s, and the circulator 40a is optically connected to a reception unit 151c and an optical amplifier 12.

The waveguide 4b is an example of a fourth waveguide and includes a filter 41b and a circulator 40b that are optically connected to each other. The filter 41b is optically connected to the transmission path 90 and the reception unit 151s, and the circulator 40b is optically connected to the transmission unit 150c and an optical amplifier 11.

Furthermore, the bidirectional transmission device 1d includes SFPs 15s and 15c. The SFP 15s includes the transmission unit 150s and the reception unit 151s, and the SFP 15c includes the transmission unit 150c and the reception unit 151c.

The transmission unit 150s is an example of a third transmission unit and transmits S-band monitoring signal light S1c. The reception unit 151s is an example of a third reception unit and receives S-band monitoring signal light S2c.

The transmission unit 150c is an example of a fourth transmission unit and transmits C-band monitoring signal light S1c. The reception unit 151c is an example of a fourth reception unit and receives C-band monitoring signal light S2c.

The bidirectional transmission device 1d does not include an optical switch 17. Therefore, the waveguides 4a and 4b respectively switch the paths of the monitoring signal light S1c and S2c between the transmission paths 90 and 91 and the SFPs 15s and 15c according to the wavelength bands of the monitoring signal light S1c and the monitoring signal light S2c.

FIG. 14 illustrates an operation of the bidirectional transmission device 1d in a case of being connected to the forward transmission device 2a. The bidirectional transmission device 1d includes an FPGA 10d instead of the FPGA 10. The FPGA 10d selects a transceiver of the monitoring signal light S1c and S2c from the SFPs 15s and 15c. However, other functions are the same as those of the FPGA 10. In a case where transmission setting of a "forward mode" is received from a network monitoring control device 9, the FPGA 10d selects the SFP 15s compatible with the S band.

A reference numeral R7c indicates a path of the monitoring signal light S1c. The monitoring signal light S1c is input from the transmission unit 150s to the filter 41a. The filter 41a guides the monitoring signal light S1c to the transmission path 91.

With this operation, the bidirectional transmission device 1d transmits the monitoring signal light S1c to the forward transmission device 2a. Note that, as the filter 41a, for example, an optical filter that has a wavelength multiplexing and separating function is exemplified. However, the filter 41a is not limited to this.

Furthermore, the circulator 40a guides the main signal light S1m to the filter 41a. At this time, the main signal light S1m is not input from the circulator 40a to the reception unit 151c. The filter 41a guides the main signal light S1m to the transmission path 91. With this operation, the bidirectional transmission device 1d transmits the main signal light S1m to the forward transmission device 2a.

A reference numeral R7b indicates a path of the monitoring signal light S2c. The S-band monitoring signal light S2c transmitted by the forward transmission device 2a is input from the transmission path 90 to the filter 41b. The filter 41b guides the monitoring signal light S2c to the reception unit 151s.

With this operation, the bidirectional transmission device 1d receives the monitoring signal light S2c from the forward transmission device 2a. Note that, as the filter 41b, for example, an optical filter that has a wavelength multiplexing and separating function is exemplified. However, the filter 41b is not limited to this.

Furthermore, the filter 41b guides the main signal light S2m transmitted by the forward transmission device 2a from the transmission path 90 to the circulator 40b. The circulator 40b guides the main signal light S2m to the optical amplifier 11. At this time, the main signal light S2m is not input from the circulator 40b to the transmission unit 150c. With this operation, the bidirectional transmission device 1d receives the main signal light S2m from the forward transmission device 2a.

Next, a transmission system in which the backward transmission device 2b and the bidirectional transmission device 1d are connected to each other will be described.

Figure 15:
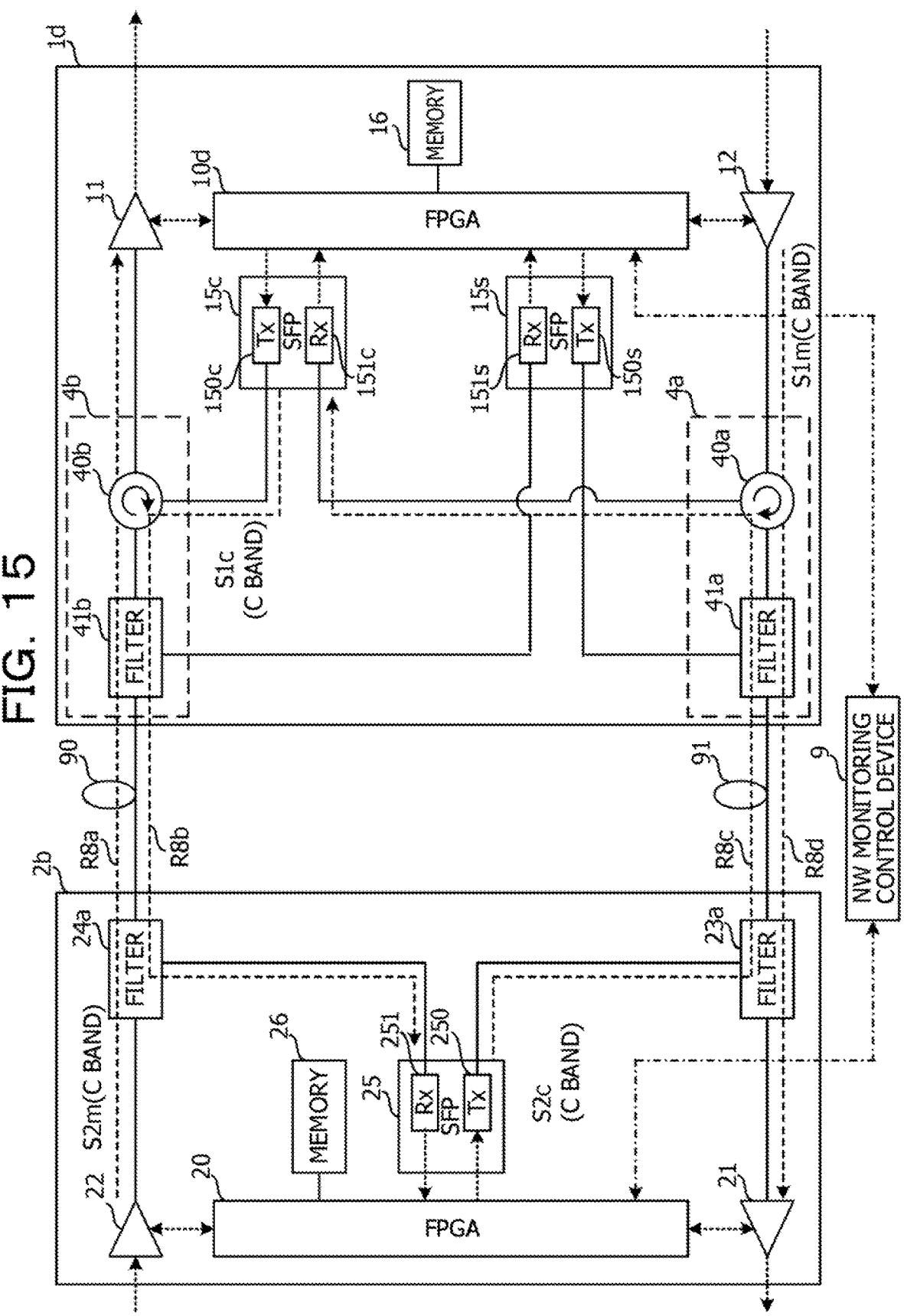
FIG. 15 is a configuration diagram illustrating an example of a transmission system, in which a bidirectional transmission device and a backward transmission device are connected to each other, according to the fifth embodiment.

FIG. 15 is a configuration diagram illustrating an example of a transmission system, in which the bidirectional transmission device 1c and the backward transmission device 2b are connected to each other, according to the fifth embodiment. In FIG. 15, the same components as those in FIG. 14 are denoted by the same reference numerals, and description thereof will be omitted.

A reference numeral R8d indicates a path of main signal light S1m. The bidirectional transmission device 1d transmits, for example, C-band main signal light S1m to the backward transmission device 2b via the transmission path 91. The backward transmission device 2b receives the main signal light S1m.

A reference numeral R8a indicates a path of main signal light S2m. The backward transmission device 2b transmits, for example, C-band main signal light S2m to the bidirectional transmission device 1c via the transmission path 90. The bidirectional transmission device is receives the main signal light S2m.

FIG. 15 illustrates an operation of the bidirectional transmission device 1d in a case of being connected to the backward transmission device 2b. In a case where transmission setting of a "backward mode" is received from the network monitoring control device 9, the FPGA 10d selects the SFP 15c compatible with the C band.

A reference numeral R8b indicates a path of the monitoring signal light S1c. The monitoring signal light S1c is input from the transmission unit 150c to the circulator 40b. The circulator 40b guides the monitoring signal light S1c to the filter 41b, and the filter 41b guides the monitoring signal light S1c to the transmission path 90. With this operation, the bidirectional transmission device 1c transmits the monitoring signal light S1c to the backward transmission device 2b.

A reference numeral R8c indicates a path of the monitoring signal light S2c. The C-band monitoring signal light S2c transmitted by the backward transmission device 2b is input from the transmission path 91 to the filter 41a. The filter 41a guides the monitoring signal light S2c to the circulator 40a, and the circulator 40a guides the monitoring signal light S2c to the reception unit 151e. With this operation, the bidirectional transmission device 1d receives the monitoring signal light S2c from the backward transmission device 2b.

In this way, the waveguide 4a guides the monitoring signal light Sic input from the transmission unit 150s to the transmission path 91 and guides the monitoring signal light S2c from the transmission path 91 to the reception unit 151c. Furthermore, the waveguide 4b guides the monitoring signal light S1c input from the transmission unit 150c to the transmission path 90 and guides the monitoring signal light S2c from the transmission path 90 to the reception unit 151s.

Therefore, the bidirectional transmission device 1d can transmit and receive the S-band monitoring signal light S1c and S2c to and from the forward transmission device 2a by the transmission unit 150s and the reception unit 151s and can transmit and receive the C-band monitoring signal light S1c and S2c to and from the backward transmission device 2b by the transmission unit 150c and the reception unit 151c.

Therefore, the bidirectional transmission device 1d can relax limitation in combinations of the transmission devices that can be connected to each other in the network. Furthermore, in a case where the connection destination is the backward transmission device 2b, the bidirectional transmission device 1d does not use the S band for the monitoring signal light S1c and S2c. Therefore, it is possible to allocate an unused S band to the main signal light S1m and S2m or Raman excitation light source.

Figure 16:
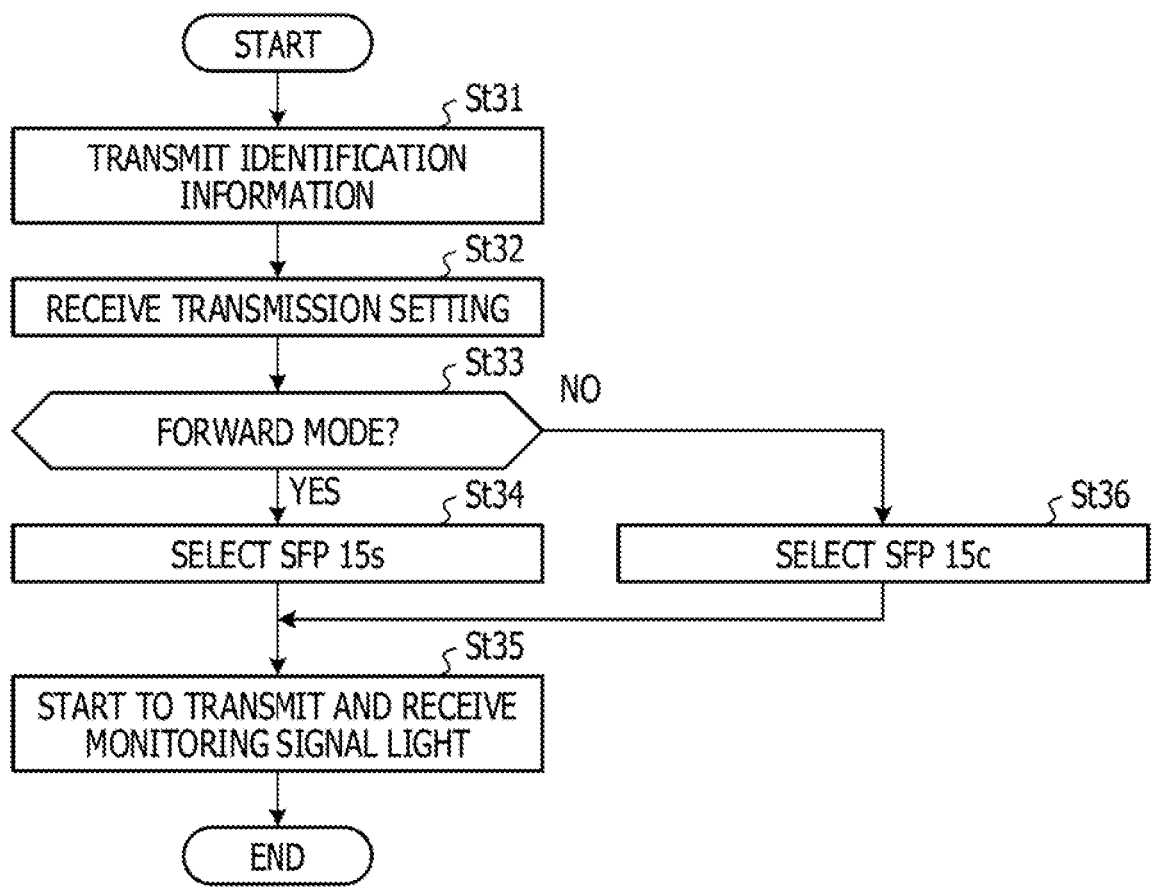
FIG. 16 is a flowchart illustrating an example of Small Form-factor Pluggable (SFP) selection processing of the bidirectional transmission device according to the fifth embodiment.

FIG. 16 is a flowchart illustrating an example of selection processing of the SFPs 15s and 15c of the bidirectional transmission device 1d according to the fifth embodiment.

The FPGA 10d reads the identification information of the device, for example, from the memory 16 in response to a request from the network monitoring control device 9 and transmits the identification information to the network monitoring control device 9 (step St31). At this time, the network monitoring control device 9 acquires identification information from the forward transmission device 2a or the backward transmission device 2b to which the bidirectional transmission device 1d is connected.

The network monitoring control device 9 determines, from the identification information, which one of the forward transmission device 2a or the backward transmission device 2b is a transmission device to which the bidirectional transmission device 1d is connected. In a case where the connection destination is the forward transmission device 2a, the network monitoring control device 9 transmits information regarding the transmission setting of the "forward mode" to the bidirectional transmission device 1d, and in a case where the connection direction is the backward transmission device 2b, the network monitoring control device 9 transmits information regarding the transmission setting of the "backward mode" to the bidirectional transmission device 1d.

Next, the FPGA 10d receives the information regarding the transmission setting from the network monitoring control device 9 via a communication port that is not illustrated (step St32). In a case where the transmission setting is the "forward mode" (Yes in step St33), the FPGA 10d selects the SFP 15s as a transceiver that transmits and receives the monitoring signal light S1c and S2c (step St34). Furthermore, in a case where the transmission setting is the "backward mode" (No in step St33), the FPGA 10d selects the SFP 15c as a transceiver that transmits and receives the monitoring signal light S1c and S2c (step St36).

Next, the FPGA 10d starts transmission and reception of the monitoring signal light S1c and S2c by the selected SFPs 15s and 15c (step St35). In this way, the bidirectional transmission device 1d executes the selection processing of the SFPs 15s and 15c.

Note that the bidirectional transmission device 1d may determine whether or not the monitoring signal light S1c is received by the PDs 19a and 19b as in the second embodiment and may select the SFP 15s or the SFP 15c according to the determination result. Furthermore, in each embodiment, another circuit such as an ASIC may be provided instead of the FPGAs 10, 10a, 10b, and 10d.

The embodiments described above are preferred examples. However, the present embodiment is not limited to this, and a variety of modifications can be made without departing from the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
    a transmitter configured to output first monitoring signal light including monitoring control information; and
    a switch that switches an output destination of the first monitoring signal light output from the transmitter to any one of a first transmission path or a second transmission path, and wherein
    a circuitry configured to acquire setting information according to a combination of the transmission device and another transmission device and instructs the switch to switch the output destination on a basis of the setting information, wherein
    in the first transmission path, a first main signal is transmitted from the transmission device to the another transmission device, and
    in the second transmission path, a second main signal is transmitted from the another transmission device to the transmission device,
    wherein the circuitry acquires the setting information from a computer coupled to the transmission device and the other transmission device.

2. The transmission device according to claim 1, wherein the switch
    switches the output destination of the first monitoring signal light to the first transmission path in a case where a transmission direction of the first monitoring signal light is the same as a transmission direction of the first main signal, and switches the output destination of the first monitoring signal light to the second transmission path in a case where the transmission direction of the first monitoring signal light is opposite to the transmission direction of the first main signal.

3. The transmission device according to claim 1, further comprising:

a first waveguide connected between the first transmission path and the switch; and a second waveguide connected between the second transmission path and the switch, wherein the transmitter is detachable from the transmission device, each of the first main signal light and the second main signal light has a band in a first wavelength band, the first waveguide guides the first monitoring signal light in a second wavelength band input from the switch to the first transmission path, and the second waveguide guides the first monitoring signal light in the first wavelength band input from the switch to the second transmission path.

4. A reception device comprising:

a receiver that receives second monitoring signal light including monitoring control information of another transmission device via one of a first transmission path and a second transmission path;

a switch that switches connection between the receiver and the first transmission path and connection between the receiver and the second transmission path; and a circuitry that acquires setting information according to a combination of the reception device and the another transmission device and instructs the switch to switch a connection destination of the receiver on a basis of the setting information, wherein in the first transmission path, a first main signal is transmitted from the reception device to the another transmission device, and in the second transmission path, a second main signal is transmitted from the another transmission device to the reception device, wherein the circuitry acquires the setting information from a computer coupled to the reception device and the another transmission device.

5. The reception device according to claim 4, wherein the switch switches to connect the receiver to the first transmission path in a case where a transmission direction of the second monitoring signal is opposite to a transmission direction of the first main signal, and connect the receiver to the second transmission path in a case where a transmission direction of the second monitoring signal light is the same as the transmission direction of the first main signal.

6. The reception device according to claim 4, further comprising:

a first detector that detects the second monitoring signal light input from the first transmission path to the optical switch;

a second detector that detects the second monitoring signal light input from the second transmission path to the optical switch; and a circuitry that instructs the optical switch to switch a connection state on a basis of detection results of the first detector and the second detector.

7. The reception device according to claim 4, further comprising:

a first waveguide connected between the first transmission path and the optical switch; and a second waveguide connected between the second transmission path and the optical switch, wherein the receiver is detachable from the reception device, each of the first main signal light and the second main signal light has a band in a first wavelength band, the first waveguide guides the second monitoring signal light in the first wavelength band from the first transmission path to the switch, and the second waveguide guides the second monitoring signal light in the second wavelength band from the second transmission path to the switch.

8. A transmission method which is performed by a transmission device, the transmission method comprising:

outputting first monitoring signal light including monitoring control information; and switching, by a switch, an output destination of the first monitoring signal light to any one of a first transmission path or a second transmission path, wherein in the first transmission path, a first main signal is transmitted from the transmission device to another transmission device, and in the second transmission path, a second main signal is transmitted from the another transmission device to the transmission device, wherein the transmission method further includes:

acquiring setting information according to a combination of the transmission device and the another transmission device and instructing the switch to switch the output destination on a basis of the setting information, wherein acquiring the setting information from a computer coupled to the transmission device and the another transmission device.

9. The transmission method according to claim 8, wherein the output destination of the first monitoring signal light is switched to the first transmission path in a case where a transmission direction of the first monitoring signal light is the same as a transmission direction of the first main signal, and switched to the second transmission path in a case where the transmission direction of the first monitoring signal light is opposite to the transmission direction of the first main signal.

10. A reception method which is performed by a reception device, the reception method comprising:

receiving second monitoring signal light including monitoring control information via one of a first transmission path and a second transmission path; and switching, by a switch, to connect a receiver to the first transmission path or connect the receiver to the second transmission path, wherein in the first transmission path, a first main signal is transmitted from the reception device to another transmission device, and in the second transmission path, a second main signal is transmitted from the another transmission device to the reception device, wherein acquiring, from a control device which is configured to monitor and control the reception device and the another transmission device, setting information according to a combination of the reception device and the another transmission device and instructs the switch to switch a connection destination of the receiver on a basis of the setting information.

11. The reception method according to claim 10, wherein the processing for switching the connection switches to
connect the receiver to the first transmission path in a case where a transmission direction of the second monitoring signal is opposite to a transmission direction of the first main signal, and
connect the receiver to the second transmission path in a case where a transmission direction of the second monitoring signal light is the same as the transmission direction of the first main signal.

* * * * *